United States Patent
Wang

(10) Patent No.: US 8,823,589 B2
(45) Date of Patent: Sep. 2, 2014

(54) SYSTEM, METHOD AND APPARATUS FOR INTEGRATED LOCAL AREA LOCATIONING, TRACKING AND COMMUNICATIONS

(76) Inventor: Xianbin Wang, London (CA)

( * ) Notice: Subject to any disclaimer, the term of this patent is extended or adjusted under 35 U.S.C. 154(b) by 125 days.

(21) Appl. No.: 13/044,233

(22) Filed: Mar. 9, 2011

(65) Prior Publication Data

US 2011/0221635 A1    Sep. 15, 2011

Related U.S. Application Data

(60) Provisional application No. 61/311,963, filed on Mar. 9, 2010.

(51) Int. Cl.
| | | |
|---|---|---|
| *G01S 3/02* | (2006.01) | |
| *G01S 5/02* | (2010.01) | |
| *H04W 64/00* | (2009.01) | |
| *G01S 5/14* | (2006.01) | |
| *G01S 5/06* | (2006.01) | |

(52) U.S. Cl.
CPC .................. *G01S 5/0242* (2013.01); *G01S 5/14* (2013.01); *H04W 64/00* (2013.01); *G01S 5/06* (2013.01)
USPC .......................................................... 342/463

(58) Field of Classification Search
USPC .......................................................... 342/463
See application file for complete search history.

(56) References Cited

U.S. PATENT DOCUMENTS

| | | | | |
|---|---|---|---|---|
| 5,058,200 | A  * | 10/1991 | Huang et al. | 455/456.2 |
| 6,347,228 | B1 * | 2/2002  | Ludden et al. | 455/456.5 |
| 6,529,820 | B2 * | 3/2003  | Tomescu | 701/120 |
| 6,674,403 | B2   | 1/2004  | Gray et al. | |
| 7,053,831 | B2 * | 5/2006  | Dempsey et al. | 342/463 |
| 7,305,467 | B2 * | 12/2007 | Kaiser et al. | 709/224 |
| 7,471,244 | B2   | 12/2008 | Omura et al. | |
| 2009/0213828 | A1 * | 8/2009  | Brundage et al. | 370/338 |
| 2009/0310586 | A1 * | 12/2009 | Shatti | 370/338 |

OTHER PUBLICATIONS

Wikipedia article, "GSM", Mar. 2, 2010 version.*
Wikipedia article, "Network Packet", Feb. 27, 2010 version.*

* cited by examiner

*Primary Examiner* — Frank J McGue
(74) *Attorney, Agent, or Firm* — Miller Thomson LLP

(57) ABSTRACT

The present invention is an integrated wireless system with multiple functionalities including robust (indoor/outdoor) position location, mobile receiver tracking and adaptive broadband communication. The present invention may be an adaptive position location system for local and indoor applications with improved accuracy, flexibility and security. The self-calibration technique of the present invention may cause, the position location system to be easily deployed. A master station may communicate with and control two or more slave stations and one or more user devices and thereby determine the position of a user device and track that user device, utilizing location reference sets, in accordance with the location of the master station and communication between the slave stations and the master station. The locationing operation of the present invention may be initiated by the user device.

22 Claims, 13 Drawing Sheets

SYSTEM, METHOD AND APPARATUS FOR INTEGRATED LOCAL AREA LOCATIONING, TRACKING AND COMMUNICATIONS

This application claims the benefit of U.S. Provisional Patent Application Ser. No. 61/311,963 filed Mar. 9, 2010.

FIELD OF INVENTION

This invention relates in general to the field of position location systems and more particularly to an adaptive position location system for local, outdoor and indoor applications.

BACKGROUND OF THE INVENTION

Position locationing capabilities have become increasingly important to various industry sectors as they look for ways to offer new revenue-generating products and services to their customers. Location-based applications encompass a broad range of markets, including, telecommunications, healthcare, fleet management, and security applications. In all cases, providing the accurate position location services under all circumstances is the predominant requirement.

Location information can be retrieved by various existing infrastructures and technologies. The most popular position location system is the Global Position System (GPS) based on a constellation of about 24 satellites orbiting the earth at altitudes of approximately 11,000 miles. In Europe, a satellite navigation system named Galileo was deployed by the European Space Agency based on a 30-satellite constellation, to provide positioning and timing services in 2008. Uncorrected positions determined from GPS satellite signals produce accuracies in the range of 50 to 100 meters. When using a technique called differential correction, users can get positions accurate to within 5 meters or less. GPS is effective and accurate outdoors, but it works very poorly, if at all, indoors and in urban canyon environments, due to its extremely weak signal strength. Moreover, GPS is vulnerable to jamming and other disruptions from manmade and natural causes.

Different new alternative position location systems were recently proposed based on other wireless communication systems, such as cellular phone networks and wireless LAN. However, position systems based on cellular networks can only achieve very limited accuracy with locationing error often large than few hundred meters. Position location system based on wireless LAN is more accurate within the service area of network. However, its application is limited by the network coverage.

In addition, most of the existing position location systems are passive, i.e., without any interaction or tracking capabilities. Also signals from different communication transmitters in existing systems are not synchronized, leading to the lack of timing reference for position location applications. In addition, existing position location system works separately from communication systems, leading to technical difficulty and time delay for user interaction and position tracking. The security of the systems is also a major disadvantage.

Generally the relevant prior art requires the use of a spatial reference in order to enable the location/tracking of a network-connected device. Furthermore, prior art examples generally require that the network component utilized provide a stable spatial reference. To achieve these requirements the prior art often involve significant infrastructure and have high associated costs. Moreover, several prior art solutions provide less than optimal accuracy in connection with the tracking of network-connected devices, as opposed to locationing abilities.

As an example, the relevant prior art includes U.S. Pat. No. 6,674,403 which discloses a system and method for performing real-time position detection and motion tracking of mobile communication devices moving about in a defined space comprised of a plurality of locales. The disclosed invention includes a network, a plurality of detectors and at least one processing system. A digital definition of the physical space is combined with a statistical signal strength model to provide a context within which mobile devices may be detected and tracked. Position detection and motion tracking are accomplished within and among the locales by processing actual signal strength data of a mobile device as it moves about or resides in the defined space, and comparing the actual data against the known statistical strength model.

As a further example, the relevant prior art includes U.S. Pat. No. 7,471,244 that discloses monitor units for television signals that comprise a reference clock; a receiver to receive a wireless television signal that may be transmitted by a television transmitter according to a transmitter clock; and a clock offset unit to determine a clock offset between the reference clock and the transmitter clock based on the wireless television signal.

SUMMARY OF THE INVENTION

In one aspect, the present disclosure relates to a system operable to provide adaptive position location for one or more user devices, said system comprising: a position location network, comprising: a master station; and two or more slave stations, said two or more slave stations being located by the master station in accordance with one or more cooperative signal processing techniques, and said master station and the two or more slave stations being location reference sets; and one or more communications links between the one or more user devices and the location reference sets that include the master station and the two or more slave stations and between the two or more slave stations and the master station, said one or more communications links being operable to support interaction between the one or more user devices; and whereby the one or more users are locatable and trackable by one or more locationing techniques based on the location reference sets, utilizing the location of the master station and communication between the master station and the two or more slave stations.

In another aspect, the present disclosure relates to a method of providing an integrated position locating, tracking and communications service, said method comprising the steps of: a master station controlling two or more slave stations by way of one or more communication links between the master station and the two or more slave stations to achieve overlapped communication coverage of a coverage area as location reference sets, and said master station and two or more slave stations being synchronized into a location position network; the two or more slave stations communicating with one or more user devices and thereby processing one or more requests from the one or more user devices and providing instructions from the master station to the one or more user devices; and determining the location of the one or more user devices utilizing the location reference sets, in accordance with a location of the master station and communication between the master station and the two or more slave stations.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The invention will be better understood and objects of the invention will become apparent when consideration is given to the following detailed description thereof. Such description makes reference to the annexed drawings wherein.

Figure 1:
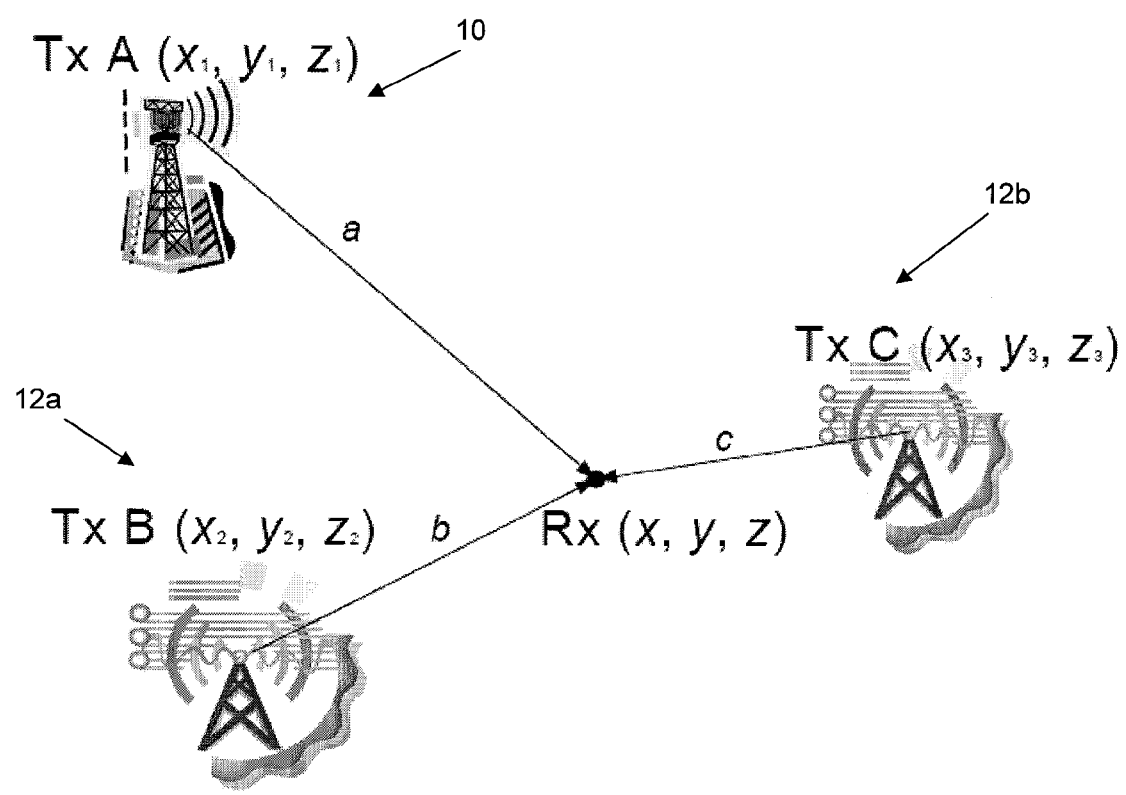
FIG. 1 shows an example of a structure of an embodiment of the present invention.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

The present invention is an integrated wireless system with multiple functionalities including robust (indoor/outdoor) position location, mobile receiver tracking and adaptive broadband communication. The present invention may be an adaptive position location system for local and indoor applications with improved accuracy, flexibility and security. The self-calibration technique of the present invention may cause, the position location system to be easily deployed. A master station may communicate with and control two or more slave stations and one or more user devices and thereby determine the position of a user device and track that user device, utilizing location reference sets, in accordance with the location of the master station and communication between the slave stations and the master station. The locationing operation of the present invention may be initiated by the user device.

The term "master station" as used herein may reference a master station that may include any master transmitting station, master transmitting node, master network station, master network node, or any other element that meets the master station requirements. The term "slave station(s)" as used herein may reference any slave station that may include any slave transmitting station, slave transmitting node, salve network station, slave network node, or any other element utilized as a slave station in the present invention.

The present invention may include one or more techniques whereby a network-connected device may easily determine the network-topology of a reference network. This information may be broadcast to enable the user of the network-connected device (e.g., a user device) to then determine its current location. Embodiments of the present invention may be operable to determine a three-dimensional co-ordinate for a network-connected device in a manner whereby special network components and network configurations may not be required. The core requirements of the present invention may include: a master station, that may be obtained in a variety of ways, for example, such as by operation of a GPS, a satellite signal, etc.; and two or more slave stations networked with the master station. These elements may, or may not, be synchronized.

To achieve the present invention the components may be chosen on an on-demand basis. For example, the assignment of the master station role to a particular network component that meets the master station requirements may be made on an on-demand basis. (One such requirement is that the master station be within a network service coverage area relating to a network-connected device.) Moreover, the slave stations to be associated with the master station may be selected based on proximity to the master station. In some embodiments external nodes may be utilized to assist the network from time to time, as needed.

A master station may request a slave station candidate that is in its vicinity to function as a slave station.

One embodiment of the position location system of the present invention may include one master station, at least two slave stations and an unlimited number of users. More slave stations may be included for improved reliability and location accuracy. The transmitters may be easily deployed and used in unexpected situations or at places where normal position location service is not available. The network of position location transmitters may be automatically set up with techniques and algorithms (or other calculations), through the coordination of the master transmitter.

All the transmitters within the network may be synchronized, or may not be synchronized, and the location of each node may be located with cooperative signal processing techniques of the present invention. Once the position location network is set up and synchronized, each transmitting node may be used as a reference point in the new position location system with its location information broadcasted by the master station. With the design of the position location system and signal format, accurate position information may be always available in the expected coverage. In addition, the position location system of the present invention may be flexible in adjusting its coverage, security level, and accuracy according to the different requirement of applications. High data rate two-way communications between the locationing nodes and the users may be realized to support more applications, including telehealth, people/property tracking, and defence.

In one embodiment of the present invention the network may be adapted to provide variable coverage. The master station may adjust its transmission power based on the service coverage areas determined by the master station, to thereby provide coverage to such service coverage areas. The master station may further send instructions to each slave station to alter its transmission power in accordance with the service coverage area determined by the master station.

One embodiment of the present invention may include a communication link between the location stations and the users. For example, the system may be used to track and monitor the location of a user device through communication between the master station and the users. This may be useful for monitoring of the mobile device. Such a system may provide tracking capability and real-time interaction between the users in the system. The position locationing/tracking system of the present invention may be fully integrated with one or more communication systems using one wireless platform and signal, without the efficiency reduction of the communication system(s). With the self-calibration technique of the present invention, the position location system may be easily deployed, and consequently no site planning effort may be needed. In addition, the position location system of the present invention may include a broadband communication link between the location stations and the users. Such broadband communication link may provide tracking capability and real-time interaction between the users in the system. The system may also have the capability of using other existing transmitters external to the network, for example, such as external radio transmitters, as locationing references or location references sets.

In embodiments of the present invention communication links may exist between the master station and the user devices, between the master station and the slave stations, and between the slave stations and the user devices.

By utilizing the communication links of the present invention, it may be possible for user devices to report their location information to the network, including to the slave stations and the master station. The tracking operability of the present invention to track a user device may then be based upon a combination of communication signals between the master station and the slave stations, as well as position location signals, such as the report from the user device to the network.

In embodiments of the present invention a single communication signal may be used to provide both communications between the master station, the slave stations and/or the user devices, as well as location information. The communication or signal packet utilized by the present invention may include any or a combination of the following: (i) an identification for the transmitter; (ii) identification of the destination; or (iii) a signal preamble for measurement that may also include handling instructions.

In one embodiment of the present invention a slave station may determine its own transmission time by using an off-line look back method.

The present invention may undertake a variety of computations, for example, such as algorithms, other calculations, etc., to achieve position locationing and tracking of user devices. Such computations may be processed by the master station or the slave stations, or any combination of master station and slave stations. A mobile user device may receive information regarding the location of the mobile user device through a communication link of the present invention.

The present invention may offer benefits and advantages over the prior art, as discussed herein. These benefits and advantages may include: a deploy and use feature enabled by the self setting-up procedure; user-defined locationing and tracking coverage through new signal and protocol design; and the complete mobility of the locationing transmitter and user devices supported by the system adaptation capability.

One benefit of the present invention over the prior art may include that the present invention may include an integrated wireless device and network, based on the wireless platform, signal, protocol and air interface, that has the capability of providing multiple functionalities including indoor position locationing/tracking, and communication. This aspect of the present invention may increase the wireless spectral and implementation efficiency, as well as the portability of the integrated device, over that of prior art inventions.

Another benefit of the present invention over the prior art may include that the present invention provides a co-operative network capable of undertaking setting up and calibration procedures, such that the position location system may be operated at "deploy-and-use" mode with the coordination of the master station. There may be no planning effort needed to deploy the present invention. Consequently, the present invention may be used in applications associated with unexpected events. The prior art lacks the ability to undertake such applications.

Another benefit of the present invention over the prior art may include that the present invention provides a signal and protocol design supporting the wireless network. Said signal and protocol design may provide position locationing, tracking and communications capabilities at the same time. The prior art is unable to undertake these types of operations.

Another benefit of the present invention over the prior art may include that the present invention provides a distance measuring technique that supports the setting up and calibration procedure through a novel signal relay approach.

Another benefit of the present invention over the prior art may include that the present invention provides a zero-delay signal relay method. The method may be based on signal design relating to the master station and slave station, such that the signal from master station may be relayed by the slave station without introducing any additional delay by the slave station.

Another benefit of the present invention over the prior art may include that the present invention provides cooperation of slave stations for the calibration and setting up of the network under the coordination of the master station.

Another benefit of the present invention over the prior art may include that the present invention provides a preamble and RF front end design that supports the real-time distance measuring.

Another benefit of the present invention over the prior art may include that the present invention provides adaptive indoor position location coverage. The present invention may provide adaptive position location service to indoor users through transmission power adjustment with a very low system complexity. This is a significant advantage over GPS and other prior art examples.

Another benefit of the present invention over the prior art may include that the present invention provides complete mobility of the system. The locationing nodes used in the new system may have complete mobility through the user-defined frequency of system calibration (i.e., the transmitter may change its position arbitrarily after the deployment of the system). This is a benefit over the prior art, such as a GPS satellite that needs a pre-determined orbit, and other systems that have fixed positions.

Another benefit of the present invention over the prior art may include that the present invention provides position tracking capability. The present invention may provide the tracking capability of its users through the combined communication signal and position location signals.

Another benefit of the present invention over the prior art may include that the present invention provides communication capability. The system of the present invention may also be used as communication devices between the master station and the users. This may be useful for monitoring of the mobile device.

Another benefit of the present invention over the prior art may include that the present invention provides user defined security. The security level of the system of the present invention may be high, compared with prior art such as GPS, and other position location systems based on wireless communication signals.

Another benefit of the present invention over the prior art may include that the present invention provides reverse position location of existing external transmitters. An idea of reverse position location may be developed such that the position of an existing communication transmitter may be determined. This may offer the benefit of improved indoor position location accuracy in comparison to prior art examples.

Reversing position location of one or more external communication transmitters may be included in an embodiment of the present invention, for example, this may occur by cooperative signal processing between the master station, slave station and user devices so that the position of one or more existing external communication transmitters are determinable to achieve improved indoor location accuracy.

Another benefit of the present invention over the prior art may include that the present invention provides a combined position location based on the information from the network and any other exiting external transmitters.

Another benefit of the present invention over the prior art may include that the present invention provides an efficient mechanism for people or asset tracking. This mechanism may be used for both indoor and outdoor applications.

Another benefit of the present invention over the prior art may include that the power consumption of the mobile device of the present invention may be reduced with the coordination of the master transmitter, depending on the users mobility and requirement. An adaptive procedure may be provided to balance the performance of the receiver and its power consumption. Consequently, the present invention may operate localization and tracking using a less powerful network-connected device than is required by the prior art. All that may be required for the present invention is a transceiver and a component that is operable to initiate in real time the operations described (this could be a hardware or a software component). Moreover, the present invention may enable location based services without the need for either significant device or network requirements.

Another benefit of the present invention over the prior art may include that the present invention provides a network routing and topology design that may be improvable by using the shortest distance between the information source and destination. This distance may be determined through the position location technology and integrated communication link.

Another benefit of the present invention over the prior art may include that the present invention provides a method that all position locationing and tracking related computations processed by the master or slave (or combination of master and slave) transmitters may utilize. The mobile device may receive its location information through the communication link.

Another benefit of the present invention over the prior art may include that the present invention may be used to achieve cooperative position locationing and tracking for the users' using existing communication infrastructure (including WIFI, WiMax, and mobile cellular communications), where users having the knowledge of their locations will help users who have difficulty in locating themselves through the cooperative position locationing and tracking technique.

Another benefit of the present invention over the prior art may include that the operations of the present invention may be implemented to software. Utilization of a fairly basic network-connected device may enable deployment of various location-based services by developing a software component that can be designed to integrate with a variety of different applications and processes. Such applications and processes may depend on location based services, such as for example mobile applications.

Another benefit of the present invention over the prior art may include that only a relative location of the network-connected device may be required by the present invention. Prior art generally requires an absolute location. Therefore no synchronization may be required by the present invention, and therefore less complex network operations may be required by the present invention.

Another benefit of the present invention over the prior art may include that it is may be possible to decrease power consumption of network-connected device of the present invention in connection with localization/tracking.

Another benefit of the present invention over the prior art may include that the localization services of the present invention may not depend on functionality deployed to the network manager as is required by the prior art. Consequently, location based services may be deployed by the present invention without the need, for example, for an upgrade to the network manager. This is an advantage and benefit over the prior art as modifications to the network manager tend to be expensive, especially when implemented without network service disruptions.

Another benefit of the present invention over the prior art may include that localization and tracking may be provided by the present invention based on communications with the local network area only. This can provide better security that is offered by the prior art.

Another benefit of the present invention over the prior art may include that the network-connected device of the present invention may determine its position on its own, which can have privacy implications. This may mean that the present invention may not require initiation of operations involving the network manager because location based services can be achieved based on communications with the network components in the relevant network area where the network-connected device is located at a particular time. Prior art methods generally depend at any time and at any location on communications with the network manager. When there are many users of network-connected devices dependence upon a network manager can raise privacy concerns because movements could be monitored even though practically speaking perhaps they are not being monitored. The present invention by not requiring dependence upon a network manager may overcome such privacy issues.

Another benefit of the present invention over the prior art may include that localization may be provided by the present invention in connection with ad hoc networks.

One embodiment of the present invention may be a method that includes networking and operating procedures for the provision of integrated position locating, tracking and communications services. A master station may have the capacity to control and communicate with a plurality of slave stations and/or user devices. Through the networking and operating procedures the overall topology of the reference stations may be fully determined by the master station. The plurality of slave stations may be placed in the coverage of the master station and may be operable to follow instructions received from the master station, and to process requests received from user devices. The user devices may be located in the overlapped coverage area of the master station and the slave stations. The user devices may be operable to follow instructions received from the master station and to send requests to reference stations.

The present invention may involve a signaling format whereby the master station may be operable to control or otherwise permit information exchanges among a plurality of user devices and a plurality of applications. Location of user devices may occur through the application of a flexible means of determining the location of user devices, for example, such as one or more of the user devices sending information to initiate the determination of the location a user device; through coordination of the master station that may include one or more signal relays.

The present invention may incorporate an operating procedure that involves the disclosure of networking or operating procedures to the position locating network of the present invention and the utilization and execution of such disclosed procedures by the position locating network of the present invention. The present invention may further include a network adaptation procedure, to achieve user defined coverage for position location, tracking and communications.

The present invention may still further include set-up and network calibration procedures, whereby the position of the master station or slave stations may be changed due to mobility. The set-up and network calibration procedures of the present invention may be automatic procedures. Such procedures may include several steps. The master station may be deployed (and in some cases may be randomly deployed) in the middle of a service coverage area, and its position may or may not be known. The master station may be operable to communicate with external networks and/or external devices. Two or more slave stations may be deployed (and in some cases may be randomly deployed) around the master station, so as to remain within the range of the effective coverage of the master station so that communications, such as instructions, from the master station may be receivable by the two or more slave stations, and communications, such as responses, from the slave stations may be receivable by the master station.

The master station may poll each slave transmitting station to determine the distance between the master station and each of the salve transmitting nodes. The master station may determine the relative position information for each salve transmitting station with respect to the master transmitting station. The master station may broadcast all of the location information of the slave stations, each slave may be part of a location reference set, to the user devices.

Slave stations or user devices may cooperate to achieve calibration and setting up of the network of the present invention, in accordance with the coordination operations of the master station, to produce distance measurements. The master station may send a request to a first slave station or user device. The request may instruct the slave station or user device to determine the signal propagation time between itself and a second slave station or user device. The signal format of the request sent from the master station may be utilized by the slave station or the user device to respond to the instructions, for example, such as any distance measurement preamble and reserved time (for the slave station or user device to respond within) included in the signal format. The signal may consist of a plurality of cyclic signal periods and the duration of each signal cycle may be longer than two times of the signal propagation time for the maximum possible distance between the master station and the slave station or user device.

The master station may calculate location information for each of the slave stations based on a variety of information. For example, the distance between the master station and each slave station may be utilized. Also, the distance between any two slave stations may be utilized. Furthermore, it may be possible to slave all of the triangles using a cosine rule involving the equation system in terms of the slave station coordinates and utilize these results to calculation location information for each of the slave stations.

The present invention may include a method of network re-calibration, to address mobility of either the master station or any of the slave stations. The master station may determine the distance between each of the slave stations and itself on a pre-determined frequency. If any change in the position information is identified, the master station may re-calculate the position information for all slave stations. The master station may re-acquire its position information from other sources, such as a GPS receiver when this step is applicable to the present invention. The master station may broadcast the updated position information of all of the slave stations. The master station may further determine the re-calibration frequency in accordance with the mobility of the master station and the slave stations.

The present invention may be operable to re-calibrate the network when the master station or slave stations travel, or otherwise are affected by their mobility. The use of the master station and slave stations as locationing nodes may require mobility of such nodes due to user-defined frequency for system calibration. For example, the transmitter may change its position arbitrarily after the deployment of the system. This may provide a benefit of the present invention over prior art locationing systems, for example, such as the GPS locationing system which involves a GPS satellite that requires a pre-determined orbit, and other prior art systems that rely upon locationing elements being in fixed positions. The present invention may be more flexible than prior art systems because the present invention may include locationing elements having mobility.

The present invention may include a method of security enhancement. Such security enhancement may be achieved through user defined adaptations, and these may be based on a plurality of signaling sets that are known to the user devices. The security level of the position location system of the present invention may be enhanced by network signaling adaptations made by the master station. A signaling adaptation may be sent to all slave stations that the signaling format has been changed.

The duty cycles of the system time for position location, tracking and communications may also be adjustable in embodiments of the present invention.

One embodiment of the present invention may be operable to undertake reverse position location of existing external transmitters. For example, reverse position location may determine the position of an existing communication transmitter. This element of the invention may improve indoor position location accuracy.

Another embodiment of the present invention may involve a method of detecting a weak first arrival path by any or both of: an iterative multipath interference estimation procedure; and a removal procedure. The method may repeat several steps until a desired performance is achieved. When the desired performance is achieved an estimated channel response may also be produced. The repeated steps may include: performing an initial channel estimation from a received signal having a known preamble to produce an estimation result; equalizing and demodulating transmitted data in the received signal to produce a transmitted result and a demoualtion result; generating a demultation result from the estimation result and the transmitted result; regenerating an ancillary signal using convolution of the demultation result; determining a second ancillary signal by removing a first ancillary signal from the received signal; and re-estimating a channel response using the second ancillary signal and the demoualtion results and the known preamble. When the desired performance is achieved the system may determine the first arrival path using a path that is a weakest path in the estimated channel response.

The position location system of the present invention, as shown in FIG. 1, may include a master station Tx A 10, two or more slave stations (here two nodes Tx B 12a and Tx C 12b are shown) and user devices which can be located or tracked. Operating of the system may be divided into system initialization stage and position location stage. In the initialization stage, the location of the master and slave stations may be determined with the coordination of the master station. Once the locations of all the nodes are derived, the master station may broadcast this information to all the user devices. Location of each user device may determine its location based on the distances between itself and three locationing nodes. These distances may be calculated in the second stage.

System Initialization Procedure (Calibration of Slave Stations)

The present invention may include a method that involves a system initialization procedure. A skilled reader will recognize that the method applied by the present invention may vary and that the method described herein is merely an example of one type of method that may be part of an embodiment of the present invention. Other methods are also possible as embodiments of the present invention.

The system initialization method of an embodiment of the present invention may include multiple steps, such as the steps that follow:

Step 1). Deploy and switch on the master station, which may be used as the anchor point in the position location system.

Step 2). Locate the position of the master station using the calibration procedure. This step may not be needed when only the relative location with respect to the master station is needed by the receiver.

Figure 13:
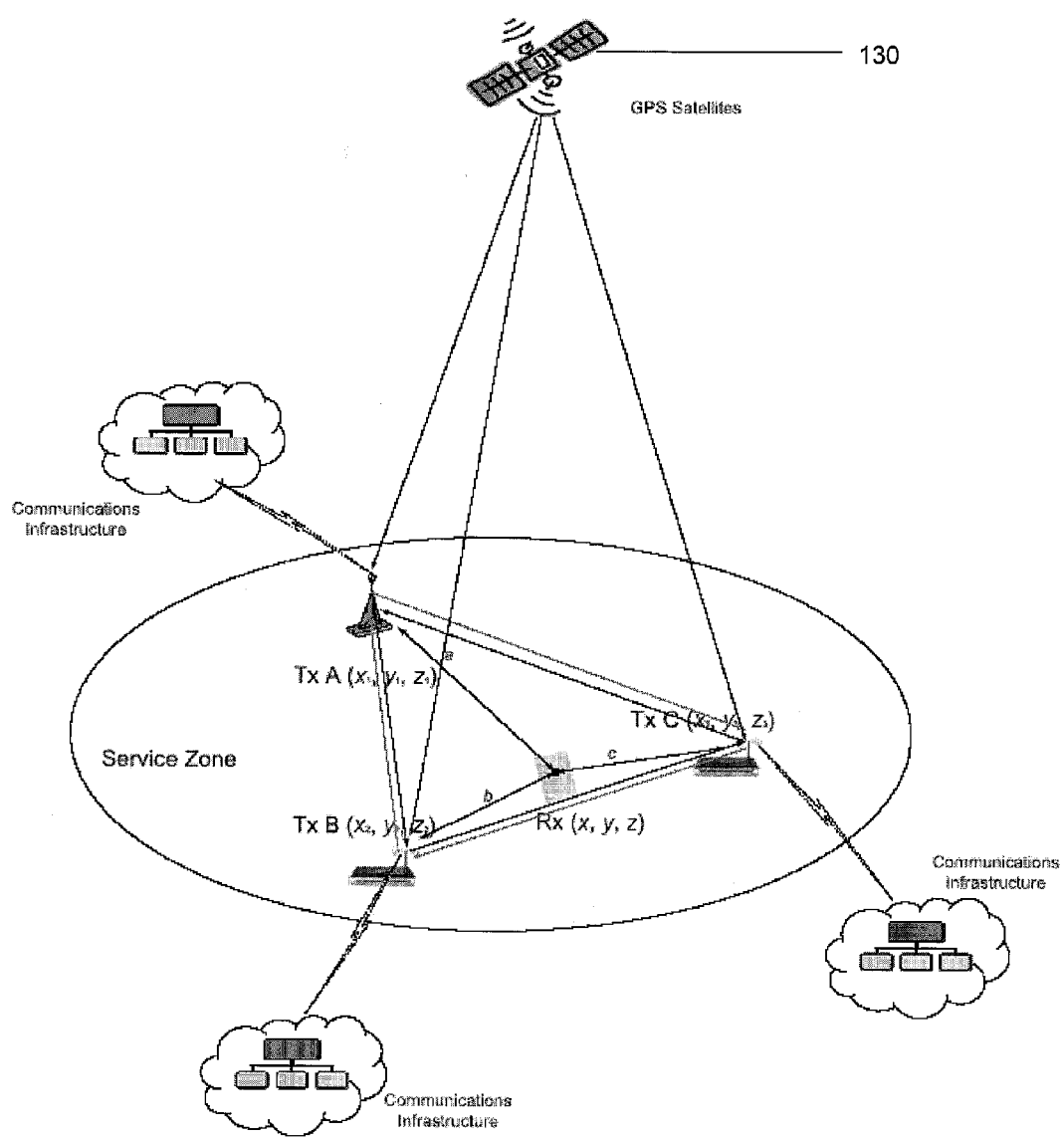
FIG. 13 shows an example of a structure of an embodiment of the present invention wherein the master station is a GPS.

The master station location can be achieved using several different means, for example, such as any of the following:

a) GPS coordinate information may be input to the system if this information is available. (In some embodiments of the present invention, as shown in FIG. 13, a GPS 130 may be the master station and the GPS may be operable to provide GPS coordinate information to the system. Other embodiments may involve a GPS that is external to the system being utilized to provide GPS coordinate information to be input to the system.)

b) Other wireless signals may be used as a reference, including the digital television broadcast signals since television signal are extremely strong and suitable for indoor applications.

c) Digital map software may be used to input the position of the master station in the interactive way, such a Microsoft™ Street and Maps, and Google™ Maps. This may be useful since very often the location of the master station on a map may be known, whereas its GPS coordinates may not be known.

In embodiments of the present invention the location of the master station may not be needed, it may only be necessary to know the relative information of the mobile devices. When the location information for the master station is not available, it may be possible to set an arbitrary coordinate for it, for example its coordinates can be set as the origin. In applications the receiving device may be interested at the relative location with respect to the master station or some known landmarks, for instance, the indoor position location applications.

Step 3). Randomly deploy the at least two slave stations within the expected coverage for position location purpose. Once a slave station is powered on, it may be verified by the master station and following verification a unique identification may be assigned by the master station. All transmitting nodes may be used as references in the tracking and locationing process. However, the location information of a particular slave station may have to be determined before that slave station can be used as a reference node in the position location technique of the present invention. This location information of a particular slave station may be required because the slave stations are randomly deployed and location information is not known.

In embodiments of the present invention that include a RF communication links design between the master station and slave stations, the master station may be using the downlink to broadcast the signaling to all slave stations using one frequency. All the slave stations may use a second frequency as the return link to report back to the master station.

Figure 2:
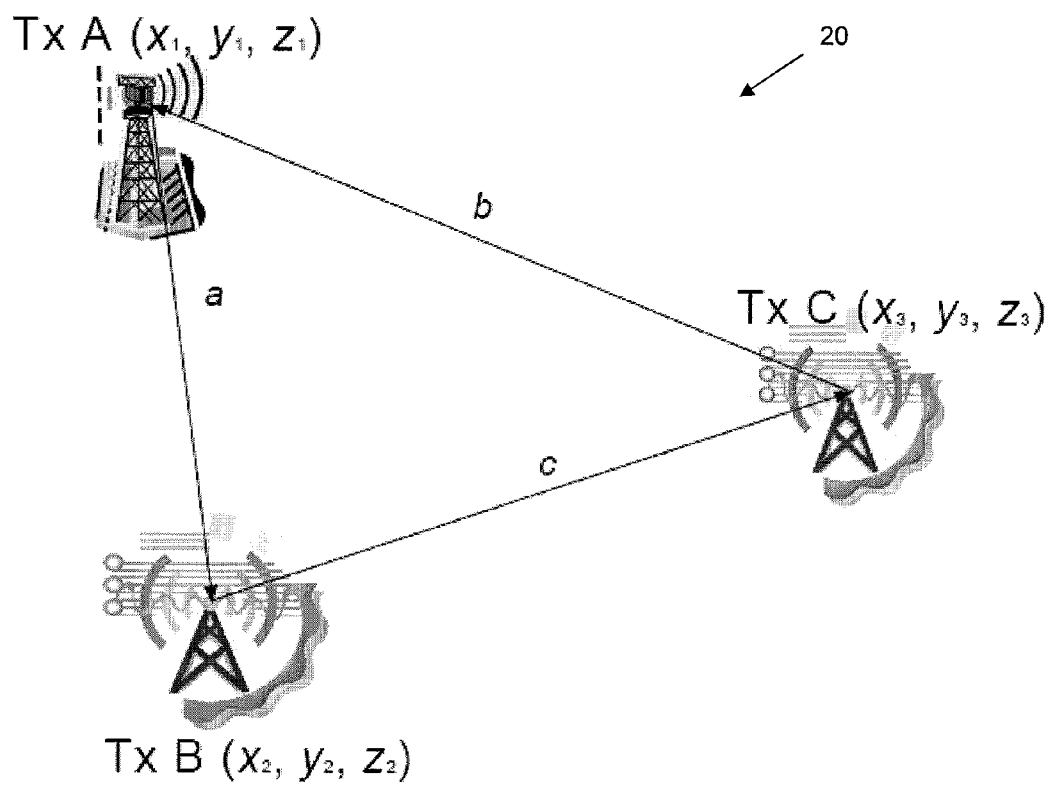
FIG. 2 shows an example of a determination of location of slave stations of an embodiment of the present invention.

FIG. 2 shows an example of an embodiment of the present invention that may be used to determine the location of two or more slave stations that may be applied by the present invention 20.

Step 4). To determine the distance between the master station and each slave station, the master station may need to send a locationing preamble signal to the slave station after it has been verified by the master station. Once the slave station receives the preamble signal, it may be required to re-transmit the signal back to the master station using a different frequency. Each slave station may have to derive its own clock from the master clock. In addition, each slave station may have to determine its own transmission time (i.e., the offset between master clock and the transmission time of the clock). These sub-steps may avoid any delay introduced by the RF front end of the slave station.

Embodiments of the present invention may include a preamble structure design that involves the duration of each preamble being longer than the propagation time needed for the coverage area of the local position location system. This preamble structure design may enable the zero-delay retransmission of the preamble by the slave stations.

Embodiments of the present invention may include a zero-delay retransmission preamble. In such a design of the preamble structure the delay of the RF front end of the slave station may be compensated through the synchronization method of the present invention. In this disclosure, the receiver may have a local stored version of the locationing preamble signal from the master station. After receiving the preamble signal from the master station the slave station may compensate the delay of the RF front-end by using a synchronized version of the local signal to compensate the RF delay.

Step 5). The slave station may have a second RF front end such that the re-transmitted locationing preamble has zero delay compared with the original signal from the master stations. To achieve this, an upsampling method may be used to improve the accuracy. Also pruning of the FFT may be used to reduced the computation complexity of the correlation to be computed.

Step 6). Determine the distances between the master stations and at least two slave stations using the propagation times between the master and the slave stations.

Step 7). Determine the distance between the two slave stations. With the coordination of the master station, one slave station may send locationing preamble to its neighboring slave stations. The distance of between two adjacent nodes may also be determined through this step.

Step 8). The location of two extra nodes may be determined through the Sine and Cosine rules for the triangle formed with the three nodes. With the known three sides of the triangle, the angles may be fully determined. An example of a means of performing this step is shown in FIG. 2, wherein a two dimensional coordinate may used. To achieve a three dimensional coordinate, one or more extra slave stations may be required. When more slave stations are available, the position location accuracy may be improved using some optimization procedure.

In one embodiment of the present invention a slave station may be operable to provide a response in a manner whereby zero-delay, or virtually zero-delay, is introduced between the phases of a received cyclic signal form the master station and the signal responding to the master station or user device. The user device or the slave stations may estimate the signal propagation and processing delay from its own radio-frequency and analog frequency front ends. An off-line loopback method may be utilized to determine the signal processing and propagation delay between the receiving and re-transmission delay. An analog front end delay compensation method, based on the re-transmission delay that is a time delay, may be applied. The signal for the master station may be relayed by the slave station without introducing phase change between the received signal from the master station and the transmitted signal from the slave station or the user device.

Link Design to Support the Initialization Procedure

The present invention may include a method and system that involves a link design to support the initialization procedure. A skilled reader will recognize that the method applied by the present invention may vary and that the method described herein is merely an example of one type of method that may be part of an embodiment of the present invention. Other methods are also possible as embodiments of the present invention.

The present invention may include a signal frame structure that includes a transmitter identification of a sending device, a transmitter identification of a packet destination, signaling indicating handling instructions (including any instructions from the master station, or any request from slave stations or user devices), and a period of reserved time for the corresponding partner to respond. Communication data, which may be in TDMA format, may follow. The present invention may include a signal frame structure designed to support network initialization and calibration procedures, and thereby to provide position locationing, tracking and communication operabilities simultaneously.

Figure 3:
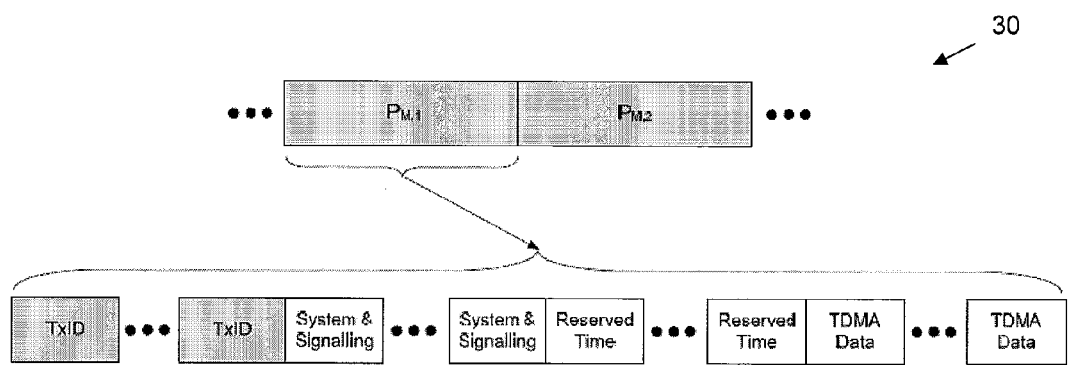
FIG. 3 shows an example of a signal frame structure for a master station with static slave stations of an embodiment of the present invention.
Figure 4:
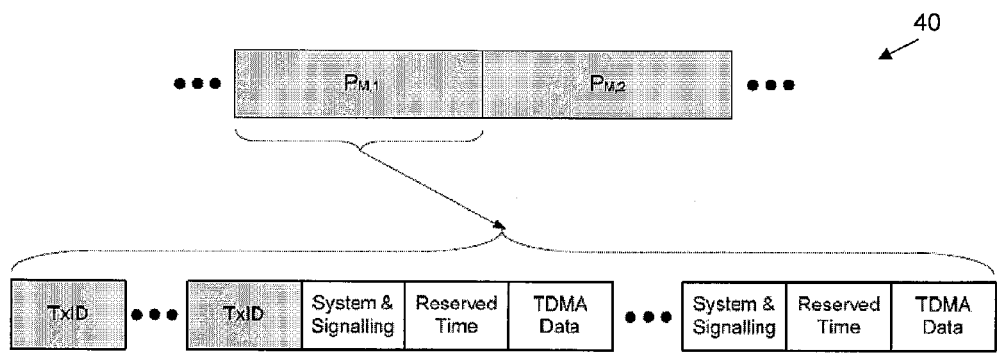
FIG. 4 shows an example of a signal frame structure for a master station with mobile slave stations of an embodiment of the present invention.
Figure 5:
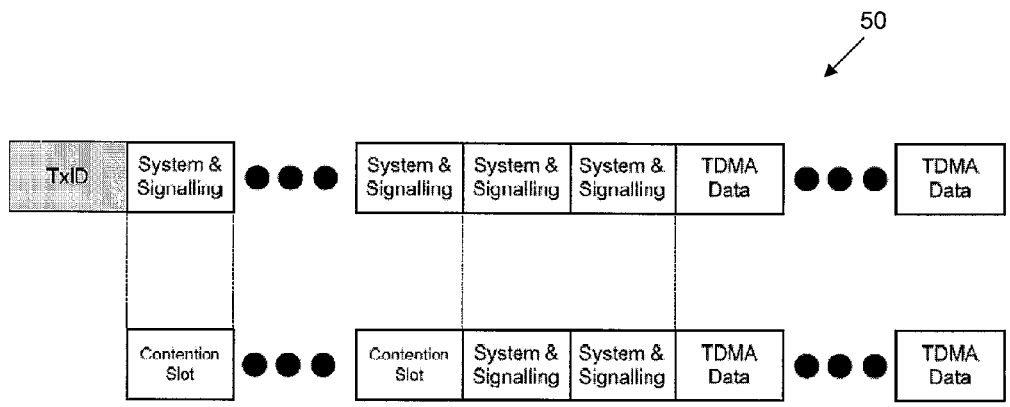
FIG. 5 shows an example of a signal format for a communication link of an embodiment of the present invention.

The present invention may include signal frame structures to support the system and these may be plotted, as shown in FIGS. 3-5.

FIGS. 3 and 4 show examples of the signaling frame structure for a signal transmitted from the master station to coordinate the initialization process and following data casting. The signal format and locationing and communication protocol may be of the design 30 shown in FIG. 3, said design may achieve the abovementioned functionalities with high spectrum and power efficiency. The difference between FIGS. 3 and 4 may be that FIG. 3 applies a particular static locationing system, whereas FIG. 4 may apply a particular mobile system 40 (i.e., either the master station or slave stations may be moving).

Signals from the master station may be sent out in packets (e.g., time slot PM1, PM2, . . . ). Each packet may come with a transmitter identification (for example, such as TxID), that indicates the destination of the packet. The system signaling inside the packet may tell what the slave needs to do, may relay the received position locationing signaling, may report data, etc. The packet may have the reserved time for the slave station to relay the position locationing preamble. It may also have the capability of sending the data to the slave stations or user devices.

FIG. 5 shows an example of a signal format for the communication signal 50. The communication signaling for the user devices and slave stations may be synchronized to the master station to achieve time division multiplexing, as shown in FIG. 5. A request may have to, be sent by the mobile device using the contention slot to obtain the access. The user device or slave station may only begin to transmit once it receives the approval from master stations through its transmitted signal and instructions using a frame structure, such as the frame structure shown in FIGS. 3 and 4.

Example

Determination of the Location Information for the Slave Stations

An embodiment of the present invention may present an example of a determination of the location information for the slave stations. A skilled reader will recognize that other embodiments of the present invention are possible.

In such an embodiment of the present invention that is an example of a determination of the location information for the slave stations, it may be assumed that two slave stations and one master station are deployed in the position location network. Position location information of the slave stations may be determined using the cosine or sine rule of triangle by the master station and the two slave stations. When the number of the slave stations is more than two, the procedure discussed here may be repeated on each triangle that can be constructed by the master station and any two slave stations. The position location obtained each time may be averaged to improve the accuracy of the process.

The cosine rule may be used to find the angles of a triangle since the length of all of sides may have been obtained in the previous procedure.

Figure 6:
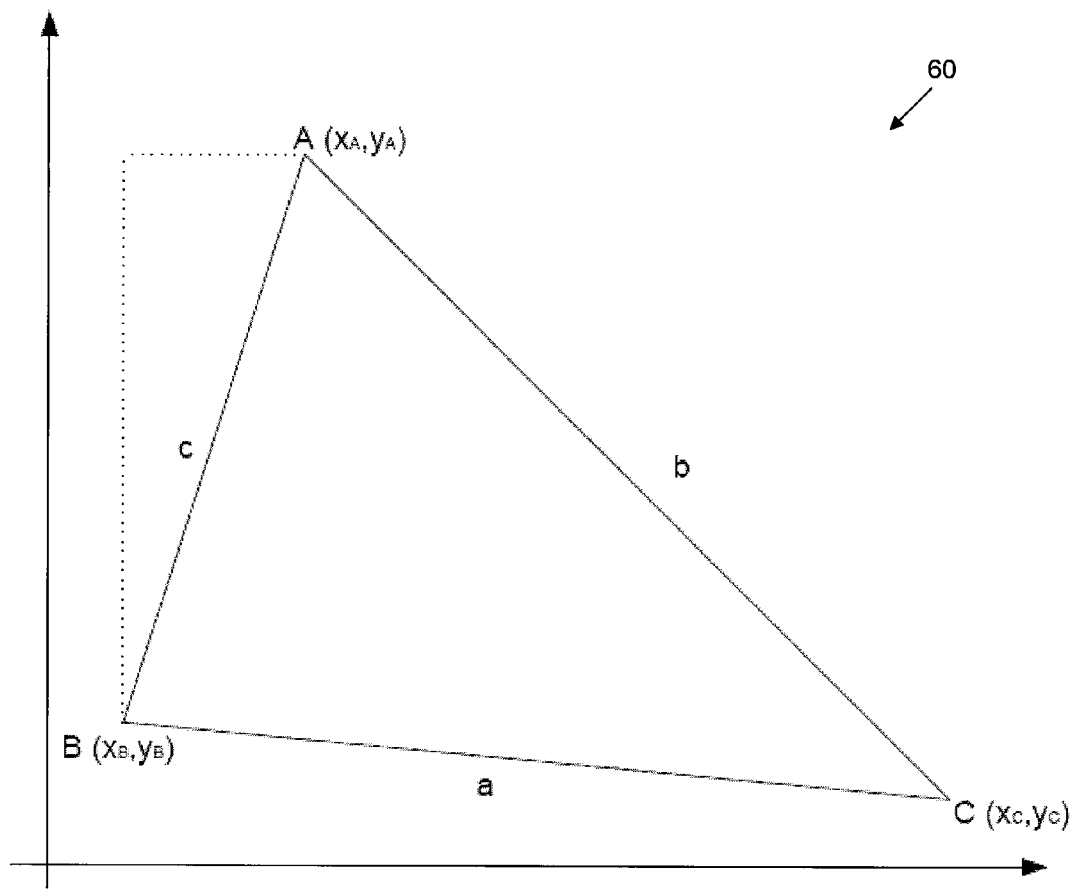
FIG. 6 shows an example of solving of a locationing triangle of an embodiment of the present invention.

FIG. 6 shows an example of solving the locationing triangle 60.

The cosine rule states:

$$a^b = b^2 + c^2 - 2bc \cos A$$

$$\text{or } b^2 = a^2 + c^2 - 2ac \cos B$$

$$\text{or } c^2 = a^2 + b^2 - 2ab \cos C$$

These may be rearranged to give $$\cos A = \frac{b^2 + c^2 - a^2}{2bc}$$

$$\cos B = \frac{a^2 + c^2 - b^2}{2ac}$$

$$\cos C = \frac{a^2 + b^2 - c^2}{2ab}$$

There may be no ambiguous case (see sine rule) when we use the cosine rule, as any angle greater than 90° will have a negative cosine.

Once the angles A, B and C are determined, the coordinates of the slave stations transmitter B and C may also be determined. Take the slave station B as an example. To solve the coordinate, it may be possible to have $$c^2 = (y_A - y_B)^2 + (x_A - x_B)^2$$

$$\frac{c}{\sin(90°)} = \frac{(x_A - x_B)}{\sin\alpha} = \frac{(y_A - y_B)}{\sin\beta}$$

For example, a=31 m, b=45 m and c=59 m. Find the angles of the triangle. It may be found that the largest angle first in case it is obtuse (greater than)90°). The largest angle is opposite the shortest side.

$$\cos C = \frac{a^2 + b^2 - c^2}{2ab}$$

$$\cos C = \frac{31^2 + 45^2 - 59^2}{2 \times 31 \times 45}$$

$$\cos C = -0 \cdot 1774 \text{ (so } C > 90°)$$

$$C = \cos^{-1}(-0 \cdot 1774)$$

$$C = 100 \cdot 2^0$$

It may be possible to use the sine rule to find one of the other angles, say A $$\frac{\sin A}{a} = \frac{\sin C}{c}$$

$$\frac{\sin A}{31} = \frac{\sin 100 \cdot 2^0}{59}$$

$$\sin A = \frac{\sin 100 \cdot 2^0}{59} \times 31$$

$$\sin A = 0 \cdot 5171$$

$$A = \sin^{-1} 0 \cdot 5171$$

$$A = 31 \cdot 1^0$$

Therefore, $$B = (180 - 100 \cdot 2 - 31 \cdot 1)^0$$

$$B = 48 \cdot 7^0$$

Using the Position Location System after Initialization

The present invention may include a method that involves using the position location system after initialization. A skilled reader will recognize that the method applied by the present invention may vary and that the method described herein is merely an example of one type of method that may be part of an embodiment of the present invention. Other methods are also possible as embodiments of the present invention.

The method of an embodiment of the present invention that involves using the position location system after initialization may include multiple steps, such as the steps that follow:

Step 1). Once the locations of all the nodes are determined, the master stations may broadcast the slave stations IDs and their locations to all the user devices.

Step 2). The receiver may have to determine the distance between the mobile device and all the transmitting nodes, including both master and slave.

Step 3). The receiver may determine its own location based on the distances between one master station and two slave stations.

In one embodiment of the present invention distance measuring may involve the master station sending a request to a slave station or user device. The request may be sent in a signal format described herein. The request may include a distance measurement preamble and a reserved time for the slave station of user device to respond to the request. The signal may further include a plurality of cyclic signal periods, and the duration of each cycle may be longer than two times of the signal propagation time for the maximum possible distance between the master station and the slave station or the user device.

The slave station or user device may replay with a local stored version of the signal format of the request sent by the master station. The slave station or user device may reply within the reserved time, and the response may be by align phase between the local response signal to be transmitted and the received request signal. Such as through estimation and compensation of the delay caused by its analog and digital front ends. The master station may receive the response from the slave station or the user device, and may determine the round-trip signal propagation time between the master station and the slave station or user device. The master station may further calculate the distance between the master station and the slave station or the user device.

Time Based Position Location

Embodiments of the present invention may involve a variety of different approaches to determine the location of receiving devices in a wireless network. Such approaches may range from direction-of-arrival detection to calculation of signal strength loss. The following provides one example of such an approach, which is a technique based on triangulation. A skilled reader will recognize that this is one example of a possible approach that may be utilized in the present invention. Other approaches are also possible for embodiments of the present invention.

The method of the present invention that involves a technique based on triangulation may involve trigonometric calculations and may be undertaken in a variety of ways, for example, such as via lateration which uses multiple distance measurements between known points, or via angulation which measures an angle or bearing relative to points with known separation. These techniques may be referred to as direction based and distance based techniques.

Direction-based techniques may measure the angle of arrival (AOA) using antenna array. Due to the fact that this AOA triangulation technique may require the use of special antennas it may not be suitable for position location applications.

Distance-based techniques may involve measurement and calculation of the distance between a receiver and one or more transmitters whose locations are known. The distance-based technique may use one or more signal attributes, for example, such as signal arrival time, signal strength, and signal phase. If the precise time a signal leaves a transmitter and the precise time the signal arrives at a receiver are measured, it may be possible to determine the time of arrival (TOA); the time it takes for the signal to reach the receiver.

Figure 7A:
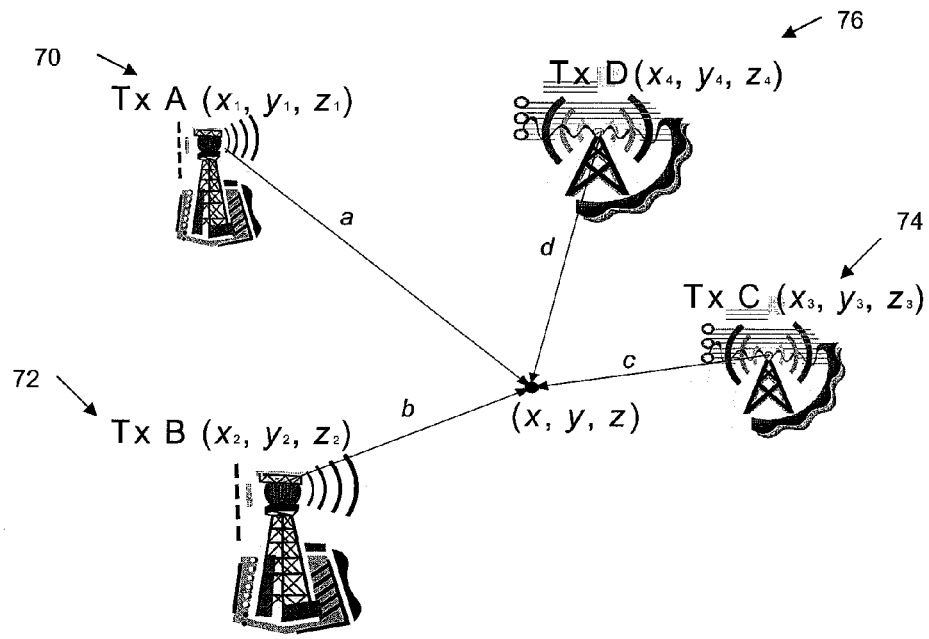
FIG. 7(a) shows an embodiment of the present invention that uses four transmitters.

In one embodiment of the present invention, four transmitters and the positioning receiver may be included, as shown in FIG. 7$a$. Three slave stations may be needed here to solve the three dimensional coordinate. The total number of the slave stations may be reduced to two if a two dimensional coordinate is used. The coordinates of the four locationing transmitters, $(x_1, y_1, z_1)$ 70, $(x_2, y_2, z_2)$ 72, $(x_3, y_3, z_3)$, 74 and $(x_4, y_4, z_4)$ 76 respectively. After the initialization stage, these coordinates may be known to the positioning receivers. Denoting the propagation time from the i-th transmitter to the positioning reception point as $t_i$, the simplified positioning algorithms without errors can be formulated as:

$$\begin{cases} t_1 c = \sqrt{(x-x_1)^2 + (y-y_1)^2 + (z-z_1)^2} \\ t_2 c = \sqrt{(x-x_2)^2 + (y-y_2)^2 + (z-z_2)^2} \\ t_3 c = \sqrt{(x-x_3)^2 + (y-y_3)^2 + (z-z_3)^2} \\ t_4 c = \sqrt{(x-x_4)^2 + (y-y_4)^2 + (z-z_4)^2} \end{cases} \quad (10)$$

where c is the constant for light propagation velocity. Four transmitters may be needed to find the coordinates of the positioning receiver when the absolute propagation time for each transmitter is not available. In this case, what is known from the received signal of the synchronous transmitter network is the relative propagation time, with a common reference timing related the transmission network. Under this circumstance, Eq. (10) can be rewritten as $$\begin{cases} t'_1 c = \sqrt{(x-x_1)^2 + (y-y_1)^2 + (z-z_1)^2} \\ t'_2 c = \sqrt{(x-x_2)^2 + (y-y_2)^2 + (z-z_2)^2} \\ t'_3 c = \sqrt{(x-x_3)^2 + (y-y_3)^2 + (z-z_3)^2} \\ t'_4 c = \sqrt{(x-x_4)^2 + (y-y_4)^2 + (z-z_4)^2} \end{cases} \quad (11)$$

where $t_i'=t_i-\Delta t$ is the absolute transmission time for the i-th transmitter with $\Delta t$ being the timing difference between the receiver reference time and the absolute time. The value of $\Delta t$ unknown but identical for all transmitters since they are all synchronized within the distributed transmitter network. The pseudorange equation in (11) may be solved without errors or by linearizing techniques.

As indicated in Eq. (11), the relative propagation time from each transmitter to the positioning receiver has to be determined. The existence and the strength of each specific transmitted signal $r_j$ from the j-th transmitter at a given reception site can be achieved by calculating correlation functions. For example, the correlation between r(n) and a locally generated identification signal $x_j(n)$ can provide the existence and strength of the j-th transmitter. Due to the orthogonal property of the selected sequence, $R_{x_j x_j}$ can be approximated as a delta function. Therefore, the channel response $h_j$ from the j-th transmitter can be approximated by $R_{rx_j}$, i.e.

$$R_{rx_j}(m) = Ah_j + \text{noise} \quad (12)$$

where A is a constant determined by $R_{x_j x_j}$ and the channel gain coefficient $\rho$. The channel response $h_j$ for the j-th transmitter can be determined, as $R_{x_j x_j}$ and $\rho$ are known. The earliest correlation peak that exceeds a particular threshold is corresponding to the direct propagation path from the location transmitter to the user device. The arrival time of the earliest correlation peak can then be converted to relative propagation time in terms of second. The correlation functions in Eq. (12) can be interpolated to improve the precision of the propagation time determined. The threshold for each node may be decided by its transmission power, the approximate distance between the transmitter and the receiver decided by the propagation time of the main path, and the maximum expected excess path loss to the signal due to the building penetration.

The main path of the auto-correlation function in Eq. (12) may always be used for transmitter identification due to its strongest signal power. However, the distance between the locationing transmitter station and the position location receiver depends only on the first arrived path. However, the strength of the first arrived signal can sometimes be weak and it may be difficult to discriminate multipath echoes from interference. In this case, the main path may be used a timing reference for averaging a number of adjacent transmitter identification results. Simple averaging of the transmitter identification results in the time domain may reduce the impact of the interference by $10 \log_{10} P$, where P is the number of averaging. The impact of the interference on a weak first arrival echo may thereby be minimized. The number of averaging needed may be determined such that the noise power after averaging is below the threshold a predetermined value, which is decided by the statistics of the interference in the transmitter identification results in Eq. (12).

It is noted that Eq. (10) and Eq. (11) are ideal position location algorithm and no errors are taken into consideration in such equations. Under realistic conditions, a number of factors may introduce position location errors, for example, such as clock error for the transmitting stations, synchronization errors between the transmitter and position location receiver, non-ideal shape of the auto-correlation peaks, multipath errors, and atmosphere errors. Multipath errors due to weak strength of the first-arrived pre-echo may be minimized by time averaging of the transmitter identification results. The main echo of the multipath may be used as the reference to align different TxID correlation functions. As a result, non-ideal shape of the correlation peak and time and frequency synchronization errors between transmitting stations and the position location receivers may be major sources of the position location process of the present invention. The accuracy of the propagation time may be affected by the non-ideal shape of the correlation peaks and timing offset of the receiver. Narrow and sharp correlation peak provides high time resolution and may be less affected by interferences. The strength of the correlation peak may be affected by frequency synchronization errors due to phase misalignment between the embedded TxID sequences and the local generated version.

Non-Ideal Correlation Function

In the previous analysis, the auto-correlation function of the transmitter identification sequence may be approximated as a Delta Kronecker function, which provides high time resolution for position location. However, the auto-correlation function may show non-ideal shape due to the bandlimitation of the channels. Embodiments of the present invention may analyze and compensate the bandlimitation effect in the transmitter identification results.

A. Bandlimitation Effect of OFDM Based System

Not all the subcarriers are necessarily used in OFDM systems to prevent adjacent channel interference. For example, in the DVB-T 2k mode, only 1706 of 2048 subcarriers are used. Under this circumstance, the baseband OFDM signal can be reformulated as $$s(n) = \frac{1}{\sqrt{N}} \sum_{k=0}^{N-1} W_k S_k e^{j\frac{2\pi nk}{N}} \quad (13)$$
$$= w \otimes p$$

where $$p = \frac{1}{\sqrt{N}} \sum_{k=0}^{N-1} S_k e^{j\frac{2\pi nk}{N}} \quad (14)$$

$$W(k) = \begin{cases} 1, & k_1 \le k \le k_2 \\ 0, & \text{else} \end{cases} \quad (15)$$

and $$w = \frac{1}{\sqrt{N}} \sum_{k=0}^{N-1} W_k e^{j\frac{2\pi nk}{N}} \quad (16)$$
$$= \frac{1}{\sqrt{N}} \frac{e^{j\frac{2\pi n(k_1+k_2)}{N}} \sin\left(\frac{\pi n(k_2-k_1+1)}{N}\right)}{\sin\left(\frac{\pi n}{N}\right)}$$

It may be assumed that the transmitter identification sequence has the same spectral mask as the OFDM signal. The cross-correlation function between the received TxID sequence and the local reference now becomes $$R_{x'x'}(m) = \frac{1}{N} \sum_{n=0}^{N-1} x'(n) x'^*(n-m) \quad (17)$$
$$= R_{xx} \otimes R_{ww}$$

where $$R_{ww}(m) = \frac{1}{N} \sum_{n=0}^{N-1} w(n) w^*(n-m) \quad (18)$$
$$= \frac{1}{N} \frac{e^{j\frac{2\pi m(k_1+k_2)}{N}} \sin\left(\frac{\pi m(k_2-k_1+1)}{N}\right)}{\sin\left(\frac{\pi m}{N}\right)}$$

Eq. (17) indicates that each echo of impulse response identified by the TxID sequence is modulated by the shaping pulse in Eq. (18) due to the bandlimitation effect.

B. Bandlimitation Effect of Single Carrier System

For most of the prior art single carrier modulated communication systems, a root raised cosine pulse shaping filter is often used. The bandlimitation effect from the pulse shaping filer is analyzed here. The frequency response of the root raised cosine filter is essentially flat across the entire band, except for the transition regions at each end of the signal. Nominally, the roll-off in the transmitter shall have the response of a linear phase root raised cosine filter according to $$W(\omega) = \begin{cases} 1, & \omega < \omega_c(1-\alpha) \\ 0, & \omega > \omega_c(1-\alpha) \\ \sqrt{1+\cos\left(\frac{\pi[\omega-\omega_c(1-\alpha)]}{2\alpha\omega_c}\right)}, & \omega_c(1-\alpha) \le \omega \le \omega_c(1+\alpha) \end{cases} \quad (19)$$

where $\alpha$ is the roll-off factor of the raised cosine filter and $\omega_c$ is half the data rate in c rad/sec. Since the pulse filtering is equally split between the transmitter's filter and the receiver's filter, by using a pair of square-root raised cosine filters. In theory, the response of the two cascaded square-root raised cosine filters is equivalent to a single raised cosine filter $$W(\omega) = \begin{cases} 1, & \omega < \omega_c(1-\alpha) \\ 0, & \omega > \omega_c(1-\alpha) \\ 1+\cos\left(\frac{\pi[\omega-\omega_c(1-\alpha)]}{2\alpha\omega_c}\right), & \omega_c(1-\alpha) \le \omega \le \omega_c(1+\alpha) \end{cases} \quad (20)$$

The impulse response of the filter in Eq. (20) is $$w(t) = \frac{\text{sinc}\left(\frac{t}{T}\right)\cos\left(\frac{\pi\alpha t}{T}\right)}{1-4\left(\frac{\alpha t}{T}\right)} \quad (21)$$

However, the limited impulse response of practical square-root raised cosine filters causes a slight difference between the response of two successive square-root raised cosine filters and the response of one raised cosine filter. The cross-correlation function between the received TxID sequence and the local reference now becomes:

$$R_{x'x'} = R_{xx} \otimes R_{ww} \quad (22)$$

C. Compensation of the Non-Ideal Correlation Function

One possible way to resolve the problem may be to eliminate the shape of the non-ideal cross-correlation function from the preliminary channel estimation results. To simplify the notations, it may be possible to rewrite the channel estimation equation as $$R_{rx_i} \approx R_{ww} \otimes h(n) + n'(n) \quad (23)$$

where n'(n) is the consolidated noise from the signal and other interferences.

Let $w = R_{ww} = [w(1), w(2), \ldots, w(L)]$. Rewrite the cross-correlation between the received signal and pilot sequence $R_{rxi}$ as vector R $$R = Ah + n' \quad (24)$$

where $$A = \begin{bmatrix} R_{ww}(L) & R_{ww}(L-1) & R_{ww}(L-2) & \ldots & R_{ww}(1) \\ R_{ww}(L+1) & R_{ww}(L) & R_{ww}(L-1) & \ldots & R_{ww}(2) \\ R_{ww}(L+2) & R_{ww}(L+1) & R_{ww}(L) & \ldots & R_{ww}(3) \\ \vdots & \vdots & \vdots & \ddots & \vdots \\ R_{ww}(L+L'-1) & R_{ww}(L+L'-2) & R_{ww}(L+L'-3) & \ldots & R_{ww}(L) \end{bmatrix}$$

when n' is assumed to be Gaussian noise, h can be resolved using:

$$h = (A^H A)^{-1} A^H R \quad (25)$$

where $A^H$ is the hermitian of A.

D. Location Aware Routing Technique

For the wireless mobile network, communication between source and destination nodes may experience traversal of multiple hops due to the users' mobility. Meanwhile, due to the dynamical location of the mobile hosts, the topology of the temporary network may change rapidly and continuously, which can cause it to be difficult to select optimal routes between mobile radios, or even may cause the mobile hosts to fail to communicate with each other. Therefore, it may be important to configure efficient and reliable wireless communication system with the most recent state of the network. Many studies have proved that the location assisted routing techniques can eliminate some limitations of conventional routing protocols and improve the routing performance by using additional location information. However, location aware routing algorithms are not widely used due to the inavailability of the users' location and subsequent update information, particularly for indoor mobile radios.

The position location technique of the present invention may cause each mobile user to obtain its position. Tracking of the mobile user may also be possible using the signaling link without reducing the communication efficiency. Thus, various efficient position-based routing algorithms may be enabled with the present invention. A skilled reader will recognize the scope of the various efficient position-based routing algorithms or other calculations that may be incorporated in the present invention or enabled by the present invention.

Figure 7B:
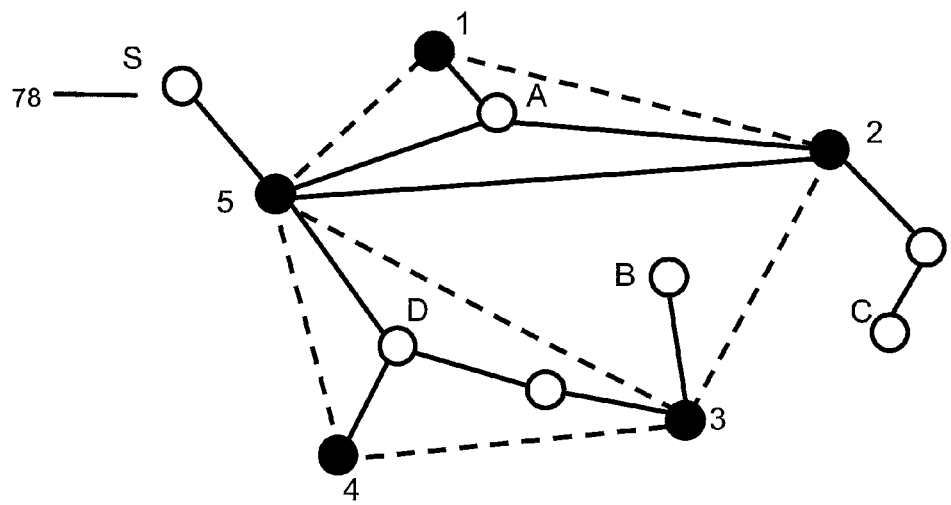
FIG. 7(b) shows an embodiment of the present invention that integrates quorum-based location service.

In order to ensure that the up-to-date version of the location knowledge is always or near-always available for the nodes in the network, quorum-based service may be adopted, where a mobile node determines its position and updates its position information at the nearest backbone node which then chooses a quorum of backbone nodes to host the position information. An example of a quorum-based location service is shown in FIG. 7(b). Node S 78 may send its updates to node 5, which might then select quorum A with the nodes 1, 2, and 5 to host the information. When node C wants to obtain the position information, it may send a query to its nearest backbone node (node 2), which in turn contacts the nodes of a quorum. Once the timely location knowledge is obtained by the mobile hosts, the packet may be forwarded to the destination with various forwarding strategies, such as Greedy Perimeter Stateless Routing, Location Aided Routing (LAR). A skilled reader will recognize that FIG. 7(b) is merely an example and that other location services are also possible in the present invention.

E. Using Other External Transmitters

With the wide deployment of numerous wireless application and systems, there may on occasion, and possibly frequently, be a wireless transmitter available close to the position locationing network of the present invention. By involving such wireless transmitters in the present invention as available external transmitters, the position location accuracy may be significantly improved through an optimization process.

Figure 8:
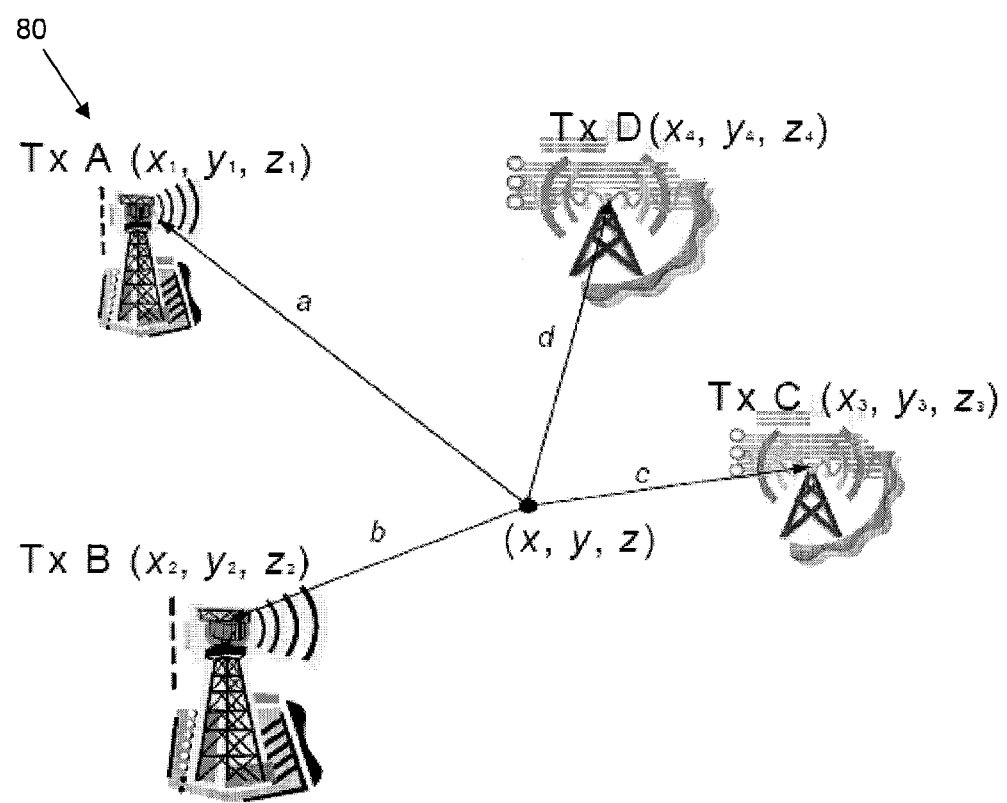
FIG. 8 shows an embodiment of the present invention that incorporates reverse position location of an external transmitter.

To determine the location of the external transmitters a reverse position location procedure may be applied by the present invention, as shown in FIG. 8. Assume the location of the master station A 80 and three slave stations are known through the initial setting-up and calibration procedures. Now it may be possible to derive the position location of the external transmitter (x, y, z) with transmission power of P.

In embodiments of the present invention there may be no synchronization between the external transmitter and the network. Therefore, the signal strength of the received signal at A, B, C, D may be considered for the reverse position location $$\begin{cases} P \cdot \left(\sqrt{(x-x_1)^2 + (y-y_1)^2 + (z-z_1)^2}\right)^\alpha = P_1 \\ P \cdot \left(\sqrt{(x-x_2)^2 + (y-y_2)^2 + (z-z_2)^2}\right)^\alpha = P_2 \\ P \cdot \left(\sqrt{(x-x_3)^2 + (y-y_3)^2 + (z-z_3)^2}\right)^\alpha = P_3 \\ P \cdot \left(\sqrt{(x-x_4)^2 + (y-y_4)^2 + (z-z_4)^2}\right)^\alpha = P_4 \end{cases} \qquad (26)$$

where $P_i$ is the received signal power for the i-th nodes, $\alpha$ is the signal attenuation constant that relates to the environment. The transmitter power information of the external transmitter may be reported to the master station with the provided communication link, as is discussed herein.

By utilizing and applying Eq. (26), the present invention may determine the location of the external transmitter. The master station may then broadcast the location information and the transmission power of the external transmitter for users to locate themselves. As there is no synchronization between the external transmitter and the location network, the locationing process by the user devices has to be based on the received signal strength.

The separation distance between the transmitter and receiver, and the received signal has the following relationship:

$$P_r(d) = \frac{P_t G_t G_r \lambda^2}{(4\pi)^2 d^2 L} \qquad (27)$$

were $P_t$ is the transmitted signal power, $P_r(d)$ is the received signal power at distance d.

$G_t$ and $G_r$ are the gain of the transmitting and receiving antennas, L is the system loss factor, and $\lambda$ is the wavelength of the operating signal.

Therefore, the distance between the transmitter and receiver can be determined as:

$$d = \sqrt{\frac{P_t G_t G_r \lambda^2}{(4\pi)^2 L P_r(d)}} \qquad (28)$$

First Arrival Path Detection in Indoor Environment

An embodiment of the present invention that is to be used in an indoor environment may be operable to achieve first arrival path detection. The first arrival path (FAP) for a radio signal in indoor environments may often be blocked by different obstacles such as concrete walls, doors and ceilings. As a result, high penetration loss can occur which may lead to extremely weak signal strength of FAP, together with the interference from later arrival paths (LAPs), significantly reduce the reliability of the FAP detection. The unique characteristics of indoor channel can make it challenging to achieve accurate TOA estimation.

The present invention may include a FAP estimation algorithm or other calculation based on LAPs interference reconstruction and cancellation. The FAP estimation algorithm or other calculation may further be based on the demodulation results of a received signal as well as channel estimation results. The LAPs interference may first be reconstructed from the recovered transmitted signal and channel estimation, and subsequently removed from the received signals. At the end of the iteration, the FAP may be estimated by using the multipath interference-suppressed signal and the augmented preamble which includes the original preamble and the regenerated transmitted data.

A skilled reader will recognize that the FAP technique and method may be of several variations. However, the following is provided as an example of one embodiment of the present invention including the FAP technique. The present invention may include other variations of the FAP technique.

The FAP technique may be presented using an OFDM system. Without loss of generality, the signal propagation between one pair of TX-RX communication link may be studied. Each OFDM data symbol may generated by $N_d$ point inverse discrete Fourier transformation (IDFT) and can be represented as $$x(n) = \frac{1}{\sqrt{N_d}} \sum_{k=0}^{N_d-1} X(k) e^{j\frac{2\pi kn}{N_d}}, \quad n = 0, 1, 2, \ldots, N_d - 1, \quad (29)$$

where $X(k)$ denotes the complex data in the kth subcarrier and $N_d$ is the total number of subcarriers. Cyclic prefix (CP) with length $N_{cp}$ longer than channel delay spread L is added to the beginning of each OFDM data symbol such that the OFDM symbol is free of intersymbol interference. Regular preambles with guard interval (GI) which is the CP of the preamble are multiplexed with OFDM data-carrying symbols periodically for synchronization and channel estimation purposes. The received signals after passing through a multipath channel can be written in the following matrix form $$\begin{bmatrix} y_p \\ y_d \end{bmatrix} = \begin{bmatrix} s_p \\ s_d \end{bmatrix} h + w @ y = sh + w, \quad (30)$$

where $y_p$ and $y_d$ are the received signals' vectors of the preamble and data symbol in the corresponding OPs, respectively. The matrix $s_p$ with size of $N_p \times L$ $$s_p = \begin{bmatrix} p(0) & p(N_p-1) & \ldots & p(N_p-L+1) \\ p(1) & p(0) & \ldots & p(N_p-L+2) \\ \vdots & \vdots & & \vdots \\ p(N_p-1) & p(N_p-2) & \ldots & p(N_p-L) \end{bmatrix} \quad (31)$$

is the circulant preamble matrix. $N_p$ is the length of the preamble. The matrix $s_d$ is the circulant matrix derived from data symbol $$s_d = \begin{bmatrix} x(0) & x(N_d-1) & \ldots & x(N_d-L+1) \\ x(1) & x(0) & \ldots & x(N_d-L+2) \\ \vdots & \vdots & & \vdots \\ x(N_d-1) & x(N_d-2) & \ldots & x(N_d-L) \end{bmatrix}. \quad (32)$$

$h = [h(0), h(1), h(2), \ldots, h(L-1)]^T$ is the multipath channel vector with length L and w denotes the additive white Gaussian noise (AWGN) vector with zero mean and variance $\sigma_n^2$.

The major departure in the receiver design from conventional OFDM is the feedback for multipath reconstruction and cancellation in the shaded blocks. The iterative processing may be relied upon to improve the LAPs and data demodulation, the estimation results from last iteration are needed. Moreover, the multipath interference canceller and the FAP detector are used to remove the LAPs interference and detect the FAP.

The LAPs is estimated by selecting the significant taps of the channel impulse response (CIR) greater than a certain threshold, where the CIR estimation $\hat{h}$ can be obtained by the Least Square (LS) estimator using the preamble $$\hat{h} = (s_p^H s_p)^{-1} s_p^H y_p. \quad (33)$$

In order to mitigate the multipath interference, an accurate estimation of LAPs and the transmitted data may be needed, so that the interference from LAPs components can be accurately reconstructed and removed. The CIR estimates provided by (33) is one natural choice to determine the LAPs. Unfortunately, the accuracy of CIR estimation is limited by the length and power of the preamble. To solve this problem, it may be possible to improve the LAPs estimation through an iterative estimator using an augmented preamble, which is the combination of the original preamble and the recovered data symbols in time domain converted from the reliably demodulated data.

The basic idea behind the iterative estimator is to utilize the new effective longer "preamble" such that the power and duration of this new training sequence is significantly enhanced as compared with the original preamble. Such as in (33), it is possible to now use both $s_p$ and $s_d$ instead of only $s_p$ to improve the CIR estimation.

However, the $s_d$ shown in (32) includes unknown transmitted data symbol. The approximation of $s_d$ can be obtained based on the tentative demodulated data using the initial CIR estimates provided by the $s_p$. The iterative estimator then progressively provides more accurate CIR estimation by using the preamble and the estimated data symbols. As a result, the data demodulation and CIR estimation will be improved simultaneously as the process is iterated. Furthermore, LAPs cancellation and FAP detection will be improved as well.

Iterative Estimator for Joint LAPs Estimation and Data Detection

The iterative estimation algorithm may be summarized as follow involving the following steps:

Step 1: Perform the initial channel estimation based on the preamble and its corresponding received signals by using (33). The iteration index is set to I=0;

Step 2: Equalize the OFDM signal in frequency domain using $$\frac{DFT\{y_d\}}{DFT\{\hat{h}^{(I)}\}}$$

with current CIR estimates. The result is denoted as $\hat{X}^{(I)}$;

Step 3: Make tentative demodulation decisions and update $\hat{X}^{(I)}$ with the results;

Step 4: Regenerate the transmitted signal $\hat{x}^{(I)}$, the time domain version of $\hat{X}^{(I)}$, via IDFT operation;

Step 5: Construct the circulant matrix $\hat{s}_d^{(I)}$ by using $\hat{x}^{(I)}$;

Step 6: Re-estimate CIR using the equation (9) with $y_p$ replaced by y and $s_p$ replaced by $$\hat{s} = \begin{bmatrix} s_p \\ \hat{s}_d \end{bmatrix}.$$

Set the iteration index to I+1 and update $\hat{h}^{(I)}$ to $\hat{h}^{(I+1)}$;

Step 7: Repeat Step 2)-Step 6) until the automatic stopping criteria is fulfilled or a predefined number of iterations is reached. Details of the automatic stopping criteria will be discussed in the next subsection.

After the CIR with improved estimation accuracy is obtained, it may be possible to determine the LAPs which introduce dominant interference to the FAP based on the estimated CIR. A threshold needs to be selected carefully to determine the significant LAPs for this purpose. When a small threshold is used, those noise-only taps will be included. However, a large threshold which will neglect those nonsignificant taps in CIR may cause some performance degradation of multipath interference cancellation if the interference from these paths still remains as residual interference. Practical multipath channels often show some level of sparsity, where very limited channel paths carry significant signal energy. Usually total background noise perturbation from those neglected paths in estimated CIR is much higher than the channel energy carried by them. Therefore, choosing a relative large threshold can improve the FAP detection by reducing interference from those paths which carry most of the channel energy.

The LAPs determination procedure can be obtained by the following steps. From the estimated CIR $\hat{h}$, first decide the strongest estimated path $\hat{h}_{max}$ by $\hat{h}_{max} = \max\{\hat{h}_i, i=0, 1, \ldots, L-1\}$. The estimates of LAPs are then given by $$\tilde{h}_l = \begin{cases} \hat{h}_l, & \text{if } |\hat{h}_l| > \eta |\hat{h}_{max}| \\ 0, & \text{otherwise.} \end{cases} \quad (34)$$

and $$\tilde{h}_{LAPs} = \{\tilde{h}_0, \tilde{h}_1, \ldots, \tilde{h}_{L-1}\}^T. \quad (35)$$

Numerical Results of Simulations

Figure 9A:
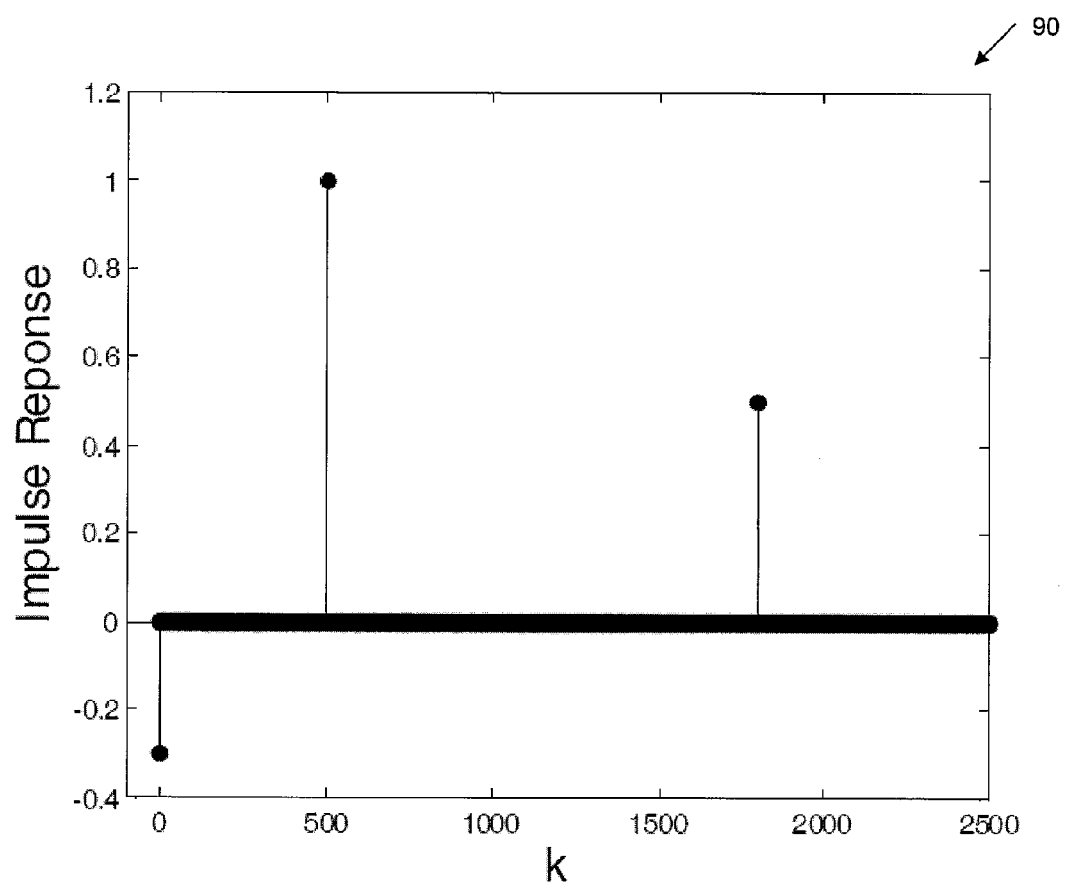
FIG. 9(a) shows a table that depicts a multipath used in a simulation of an example of a transmitter identification using Kasami Sequence that is an embodiment of the present invention.
Figure 9B:
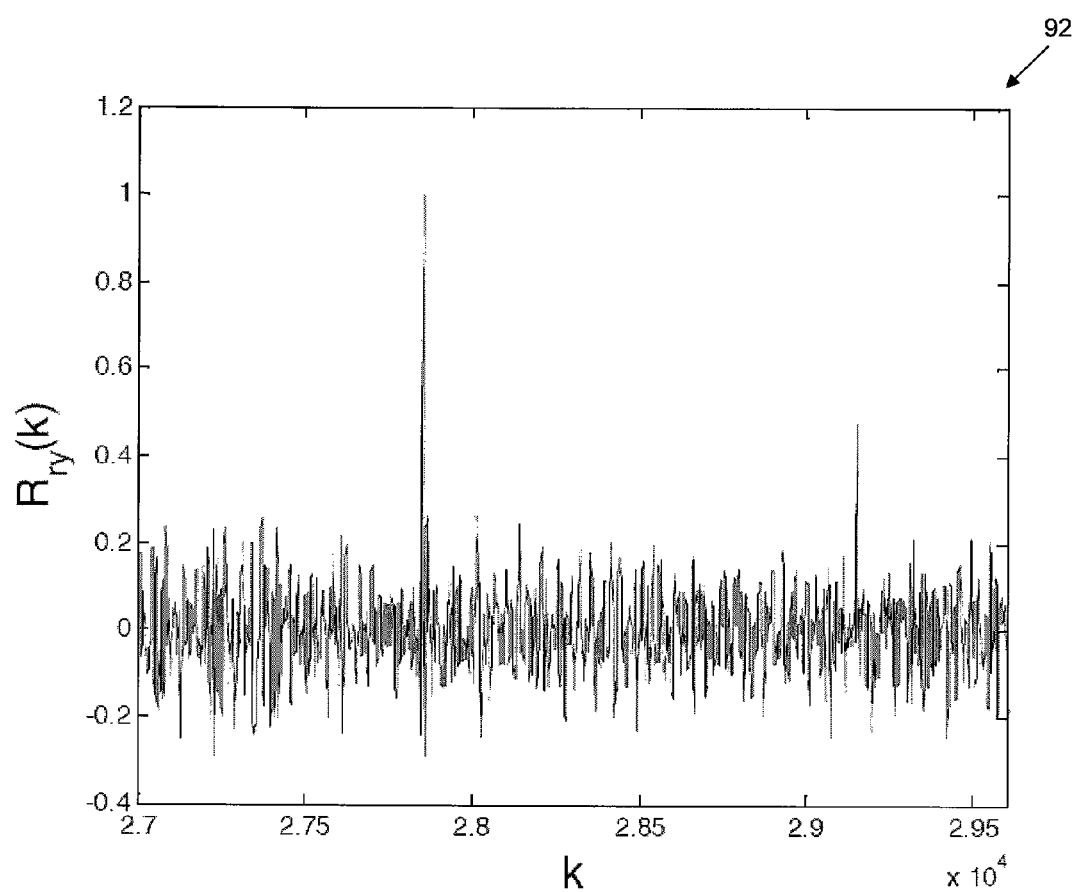
FIG. 9(b) shows a table that depicts identification results of an example of a transmitter identification using Kasami Sequence that is an embodiment of the present invention.
Figure 9C:
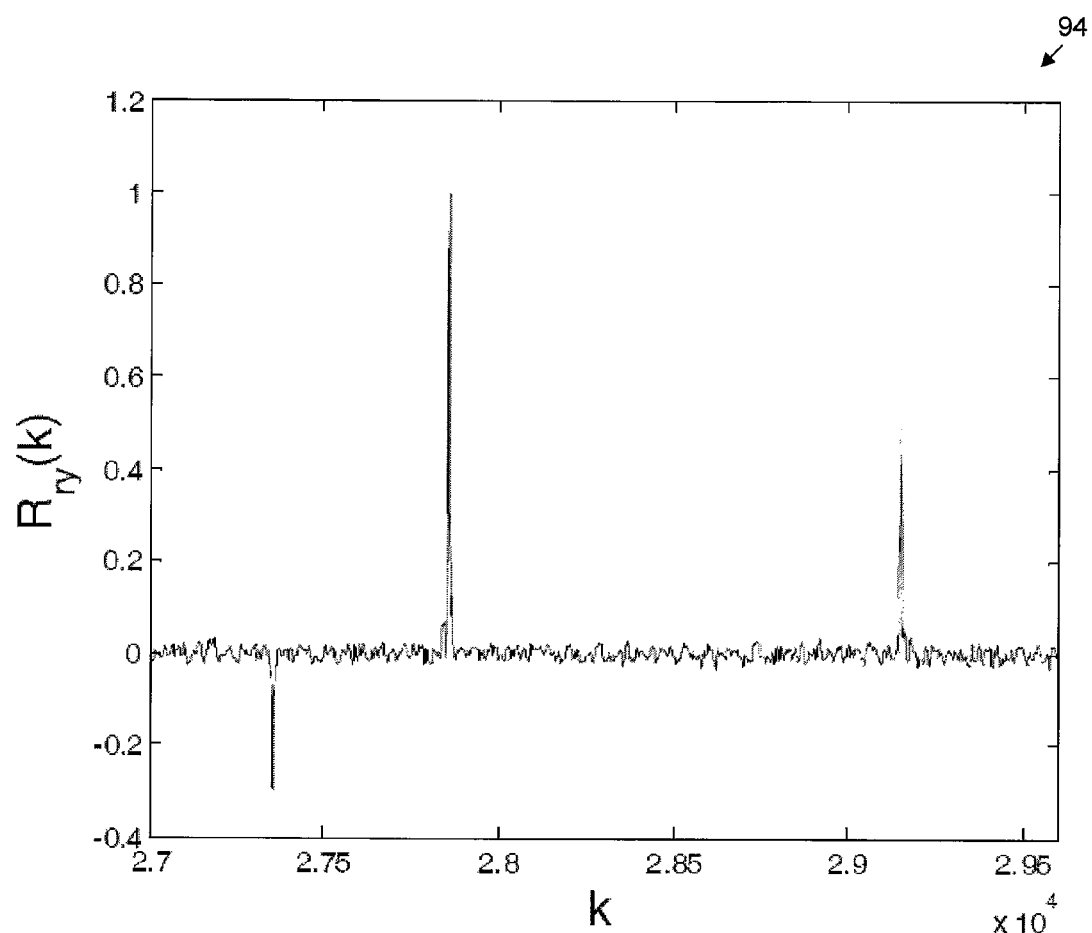
FIG. 9(c) shows a table that depicts identification results that are an average of sixty (60) times of applying an example of a transmitter identification using Kasami Sequence that is an embodiment of the present invention.

Numerical simulations of the position location and transmitter identification algorithms or calculations have been carried out. In particular, a code generator for the Kasami sequence was developed in Matlab. Simulations of the transmitter identification and position location using Kasami sequence (TxID) have been carried out. Simulation results are shown in FIGS. 9(a)-9(c). Specifically, FIGS. 9(a), (b), (c) show examples of transmitter identification using Kasami Sequence: FIG. 9(a) shows a table 90 with results of the present invention with a multipath used in the simulation; FIG. 9(b) shows a table 92 with identification results of the present invention; and FIG. 9(c) shows a table 94 with identification results of an average of 60 times of simulations.

Raised-cosine pulse shaping and limited bandwidth effects were included in transmitter identification simulation. A channel with a 6 dB and a 10 dB echoes were used for the desired transmitter. This dynamic range is good enough for transmitter identification, but may be low for channel estimation and low-level interference signal identification. Embodiments of the present invention may include superimposition of the correlation functions to provide an improved dynamic range that may smooth out the interference.

A time domain averaging technique was employed, as shown in FIG. 9(b). The improvement in TxID dynamic range is calculated as $10 \log_{10} P$ dB, where P is the number of averaging times.

Band pass filtering effects from the transmitter and receiver front ends were not applied in the simulation shown in FIG. 9(b) for simplicity reasons. In this case, the TxID results are in fact the convolution of the channel response in FIG. 9(a) with the combined impulse response of transmitter and receiver front ends. For TxID purpose, FIG. 9(b) is accurate enough, since only the strength of the main signal and strong multipath are to be identified. More precise channel estimation and interference identification may be obtained by reducing the bandlimit effects via deconvolution techniques, as indicated in FIG. 9(c).

Figure 10:
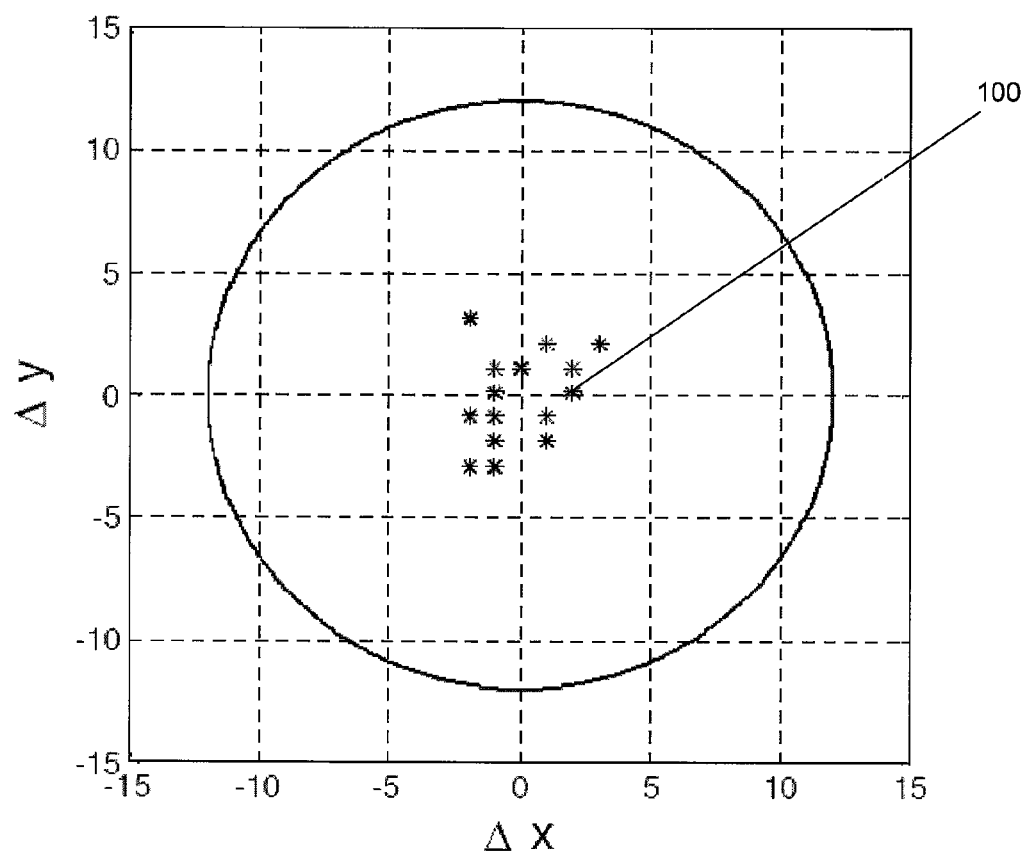
FIG. 10 shows an example of numerical results for an embodiment of the present invention based on TxID signal.

To verify the present invention location system, three transmitters were selected for the numerical simulations. Here the timing reference is assumed to be known to the receiver. Therefore only three transmitters are needed to find out the three unknown parameters of the receiver's coordinates. The GPS coordinate of the master transmitters is first converted to Cartesian coordinates (x,y,z). With the initialization procedure, the coordinates of the two slave stations are determined. The non-linear equation system in Eq. (11) is solved using optimization techniques. Background noise was also injected. To simplify the analysis, free-space propagation models were used for all the three transmitters. The location results from the simulation are shown in FIG. 10, where each star 100 represents one round of location process. The accuracy of locationing process can be evaluated by the distance between the location results and the true location of the receiver (origin of the coordinates). The simulation results indicated the accuracy of the location system may be within ten meters.

Figure 11:
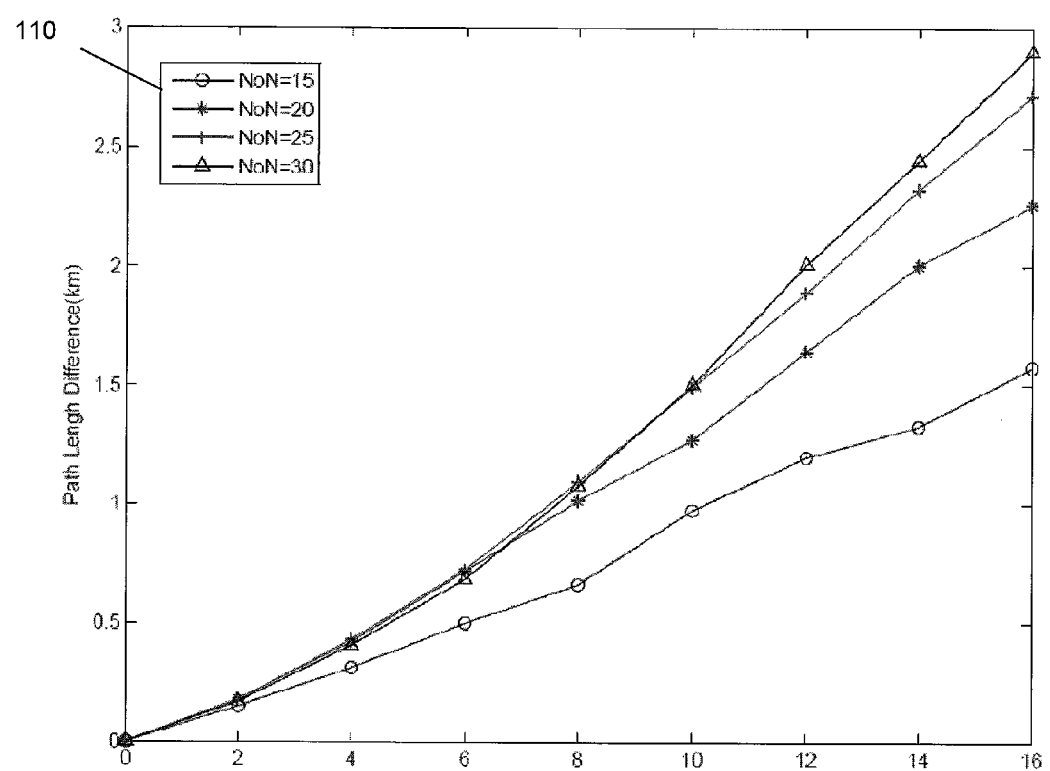
FIG. 11 shows an example of a path difference between wireless networks with and without location knowledge that are embodiments of the present invention.

The simulations for the routing technique of the position location system are operated to prove the benefit of the location knowledge for the routing performance. Assume that there are certain amount of nodes in the area of $10 \times 10$ km$^2$, and all the nodes randomly located in the network have the same communication range which is 1 km. Meanwhile, it is assumed that only the path length is the considered cost in the routing protocol. In this simulation, the dijkstra algorithm is used to find the shortest path length between the assigned transmitter and the receiver and one of the node randomly moves in the circle with a radius of r. The average path lengths 110 in the scenarios that the timely location knowledge is known by the nodes or not for 100000 Monte Carlo experiments with different node density are presented in FIG. 11. It is evident that the path length of routing operation with timely location knowledge is shorter than the case only with the history location information.

It will be appreciated by those skilled in the art that other variations of the embodiments described herein may also be practiced without departing from the scope of the invention. Other modifications are therefore possible. For example, embodiments of the present invention may be utilized for applications, including telehealth, defense, and security.

In a telehealth context the present invention may have a wide application as Canada is a large country with diverse geography, transportation and climatic conditions, where 25-30% of the population resides in rural and northern isolated communities with limited access to health care services. In addition, the average life expectancy of Canadians increased substantially from 60 in 1920 to 78 in 2007, leading to a higher percentage of the senior citizens. Providing efficient and cost-effective healthcare to these population groups brings significant challenges to traditional healthcare sector.

One embodiment of the present invention may enable position location and communication technologies and infrastructure for the next generation telehealth system. This embodiment of the present invention may involve the convergence of the position location (people tracking) system, wireless communication and bio-medical devices. Such an embodiment of the present invention may enable the proliferation of health-care service technologies in cost-effective, flexible and efficient ways. Historically, telehealth includes monitoring of parameters such as heart rate, blood pressure, and other physiological signals at a fixed remote location of a patient. An embodiment of the present invention may cause telehealth to be enhanced by improved patient mobility through people-tracking capabilities. With the improved indoor and outdoor position location capabilities of the present invention, patients may move freely to any place within the coverage of the system. In addition, with help of the wireless sensor networks and smaller bio-medical devices, information from the patients may be connected to the health institution's information system in real-time or near real-time. Health monitoring performed by a telehealth embodiment of the present invention may include physical activity monitoring such as monitoring of movement, fall detection, location tracking, and such monitoring may be accessed by a physician from any given location. The results and advances from this research may reshape some of the mechanisms of existing healthcare delivery in a cost-effective way and thereby provide a benefit over known prior art.

Figure 12:
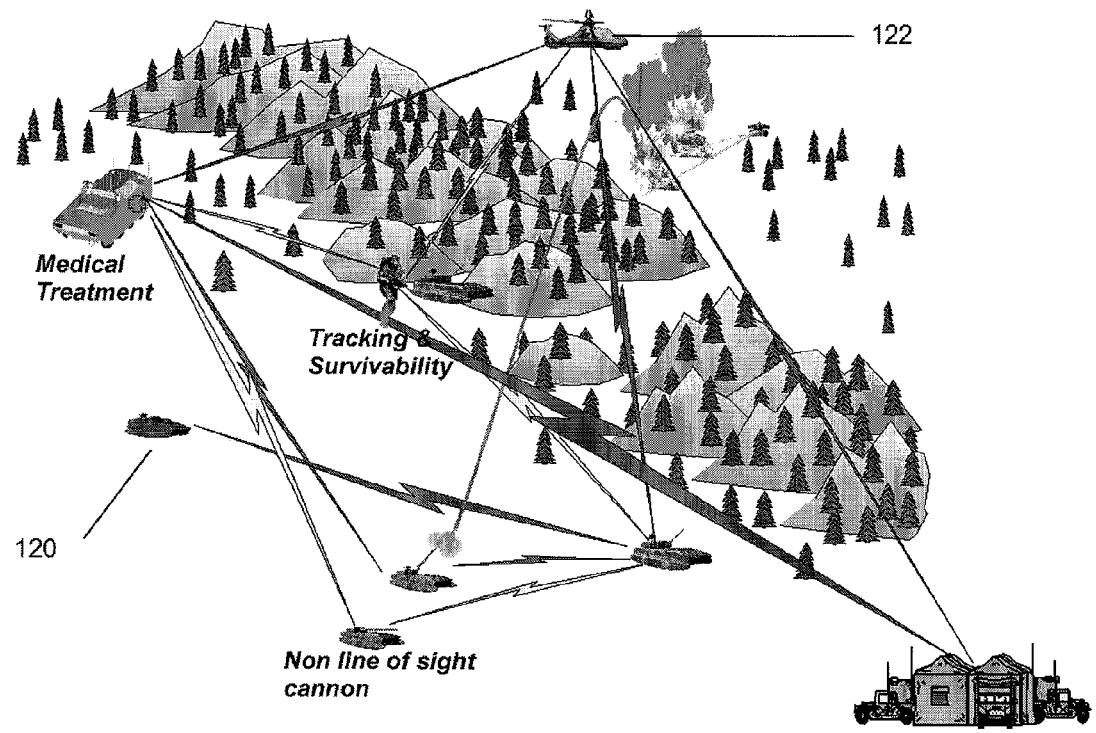
FIG. 12 shows an example of an application of an embodiment of the present invention in a battlefield environment.

Another example of an application of the present invention is as positioning, tracking and situation-aware communications application that may be used in a battlefield. Due to ever-increasing mobility, a modern battlefield needs rapid acquisition/collation of location information and quick dissemination of decisions of field commanders. As a result, there is a need for a multifunctional wireless systems to achieve highly reliable broadband communications in the field. The system of the present invention may further provide embedded position location and tracking capabilities with enhanced security level for defence applications. As shown in FIG. 12, the reference positioning network may be set up using military vehicles 120, helicopters 122 etc. The network of the present invention may be able to provide integrated services to soldiers in the battlefield, including positioning, tracking and communications. The system of the present invention may also be able to adjust itself to support motilities from the reference station, or to enhance the security of the network.

What is claimed is:

1. A system operable to provide adaptive position location with adjustable duty cycle for position location and different requirements in an integrated wireless network for one or more user devices, said system comprising:
   (a) an integrated wireless network, comprising:
      (i) a master station;
      (ii) two or more slave stations with initially unknown relative positions with respect to the master station, said two or more slave stations being located by the master station before use of the two or more slave stations as known location references in accordance with one or more cooperative signal processing techniques, and said master station and the two or more slave stations being chosen as location reference sets during network setting up and initialization stage with the relative reference node positions of the slave stations determined by communication with the master station; and
      (iii) one or more user devices to be located using the location reference sets in (ii) during the position location stage
   (b) an integrated adaptive communications link between the one or more user devices and the location reference sets that include the master station and the two or more slave stations and between the two or more slave stations and the master station, said integrated adaptive communications link being operable to support adaptive two-way interaction between all reference nodes and the one or more user devices under the adaptive coordination of the master station for system setting up, adaptation, self-calibration and position location; and
   whereby the one or more user devices are relatively locatable and trackable by one or more locationing techniques based on the location reference sets, utilizing the location of the master station and communication over the integrated adaptive communications link between the master station and the two or more slave stations.

2. The system of claim 1, wherein initial positions of all reference nodes in the reference set are determined by communication between a plurality of stations under the coordination of the master station for relative indoor and outdoor position location, and at least one initial position of the reference node in the reference set is utilized for absolute position location.

3. The system of claim 1, wherein the one or more locationing techniques are instigated by communication from the one or more user devices to the position location network.

4. The system of claim 1, wherein the integrated adaptive communications link comprises at least one of the following:
   (a) two-way communications links;
   (b) adaptive broadband communication links; and
   (c) cooperative interaction among the master station, one or more slave stations and one or more user devices.

5. The system of claim 1, wherein the integrated adaptive communications link is operable to perform at least one of the following:
   (a) mobile user device tracking;
   (b) real-time interaction between users; and
   (c) real-time interaction between the master station and the two or more slave stations.

6. The system of claim 1, wherein the location reference sets are calibrated and the location information for each reference point is broadcast by the master station.

7. The system of claim 1, wherein the one or more master stations are operable to perform a self-calibration technique of the position location network, whereby the system is easily deployed in a manner lacking site planning effort.

8. The system of claim 1, wherein the master station is operable to automatically coordinate the set-up of the position of the location reference sets in the position location network through one or more set-up techniques.

9. The system of claim 8, wherein the one or more set-up techniques include one or more algorithms for the determination of network operating parameters including one or more of transmission power, time clock, duty cycle of system time for position location, tracking and communications.

10. The system of claim 1, wherein other existing radio transmitters external to the position location network are localized by cooperative signal processing by the master station and the two or more slave stations utilized as locationing references.

11. The system of claim 1, wherein one or more functions including position location, tracking and communications, are integrated with the system using one wireless platform and signal.

12. The system of claim 1, wherein the system is flexible to adjust according to system requirements, including mobility of the reference nodes, at least one of the following system operating parameters: coverage, security level, accuracy, and duty cycles of the system time for position location, tracking and communications purposes.

13. A method of providing an integrated position location, tracking and communications service in an integrated wireless network with one or more initially unknown reference node positions, said method comprising the steps of:
   (a) a master station controlling two or more slave stations with one or more initially unknown reference node positions by:
      establishing integrated adaptive communications link and protocol for position location, tracking and communication service between the master station and the two or more slave stations to achieve overlapped communication coverage of a coverage area as location reference sets, and synchronizing said master station and two or more slave stations into a position location network with the relative positions of the reference node positions of the slave stations determined by an automatic setup and calibration procedure coordinated by the master station;

(b) the two or more slave stations communicating with one or more user devices and thereby processing one or more requests from the one or more user devices and providing instructions from the master station to the one or more user devices;

(c) determining the location of the one or more user devices utilizing the location reference sets, in accordance with a location of the master station and communication between the master station and the two or more slave stations;

(d) determining duty cycles for position location, tracking and communication in the integrated network to provide integrated position location, tracking and communication service; and (e) adjusting one or more system operating parameters including the duty cycles for position location, tracking and communication to meet system requirements.

14. The method of claim 13, comprising the further step of tracking the one or more user devices by utilizing the determined location of the one or more user devices.

15. The method of claim 13, comprising the further step of determining the location of the one or more user devices by at least one of the following steps:

(a) utilizing user-provided information responding to the request from the master station or the two or more slave stations;

(b) the master station coordinating the position location of the one or more user devices; and (c) utilizing one or more signal relays.

16. The method of claim 13, comprising the further step of automatically setting up and calibrating the location position network by the following steps:

(a) deploying the master station in approximately the middle of the overlapped communication coverage area;

(b) deploying the two or more slave stations around the master station so that the two or more slave stations are operable to communicate with the master station;

(c) the master station polling each of the two or more slave stations and thereby determining the distance between the master station and each of the two or more slave stations and also determining the relative position information of each of the two or more slave stations with respect to the master station; and (d) the master station broadcasting location information of the two or more slave stations and the master station to the one or more user devices.

17. The method of claim 13, comprising the further step of arranging a signal frame structure by the following steps:

(a) the master station identifying a device sending a communication as a sending device;

(b) the master station identifying a packet destination of a packet sent by the sending device;

(c) signaling to indicate the handling instruction, said handling instruction including at least one of the following: instructions from the master station, requests of the two or more slave stations, or request from the one or more user devices;

(d) reserve responding time in the signal frame structure for response from the sending device; and (e) receiving and handling response communication data sent in response to the communication.

18. The method of claim 13, comprising the further step of the master station calculating the location information for each of the two or more slave stations based on at least one of the following:

(a) distance between the master station and each of the two or more slave stations;

(b) distance between any of the two or more slave stations; and (c) solving the position location equation system in terms of coordinates of the two or more slave stations.

19. A method of providing an integrated position location, tracking and communications service, said method comprising the steps of:

(a) a master station controlling two or more slave stations by way of one or more communication links between the master station and the two or more slave stations to achieve overlapped communication coverage of a coverage area as location reference sets, and said master station and two or more slave stations being synchronized into a position location network;

(b) the two or more slave stations communicating with one or more user devices and thereby processing one or more requests from the one or more user devices and providing instructions from the master station to the one or more user devices;

(c) determining the location of the one or more user devices utilizing the location reference sets, in accordance with a location of the master station and communication between the master station and the two or more slave stations; and (d) adapting the communication coverage to of each reference station under coordination of the master station and thereby vary the overlapped position location, tracking and communication coverage area by:

(i) the master station adjusting transmission power based on service coverage areas determined by the master station; and (ii) the master station sending instructions to each of the two or more slave stations to alter transmission power according to the overlapped communication coverage determined by the master station.

20. The method of claim 19, comprising the further step of reversing position location of one or more existing external communication transmitters by cooperative signal processing between the master station, the two or more slave nodes and one or more user devices, so that the position of one or more existing external communication transmitters are determinable as additional location reference to achieve improved position location accuracy.

21. The method of claim 19, comprising the further step of measuring distance by performing the following steps:

(a) the master station sending a request to one of the two or more slave stations or to one of the one or more user devices, said request being sent in a signal format including a distance measurement and reserved time for the one of the two or more slave stations or the one of the one or more user devices to respond, said signal format consisting of a plurality of periods of cyclic signal each having a duration that is longer than two times the signal propagation time for the maximum possible distance to be measured;

(b) the one of the two or more slave stations or the one of the one or more user devices sending a request response as a reply within the reserved time with a local stored version of the signal format by an aligned phase between the local stored version of the signal format and the received request through estimation and compensation of delay caused by its analog and digital front ends;

(c) the master station receiving the request response from the one of the one or more user devices;

(d) the master station determining a round-trip signal propagation time between the master station and the one of the one or more user devices; and (e) the master station calculating the distance between the master station and the one of the one or more user devices.

22. The method of claim 19, comprising the further step of detecting a weak first arrival path by at least one of the following procedures in accordance with the steps that follow: an iterative multipath interference estimation procedure; and a removal procedure,
  (a) repeating the following steps to achieve a desired performance, and producing an estimated channel response;
    (i) performing an initial channel estimation from a received signal having a known preamble to produce an estimation result;
    (ii) equalizing and demodulating transmitted data in the received signal using the estimation result to produce a transmitted result and a demodulation result;
    (iii) generating a demodulation result from the estimation result and the transmitted result;
    (iv) regenerating an ancillary signal using convolution of the demodulation result and estimation result;
    (v) determining a second ancillary signal by removing a first ancillary signal from the received signal; and
    (vi) re-estimating a channel response using the second ancillary signal and the demodulation results and the known preamble; and
  (b) determining the first arrival path using a path that is a weakest path in the estimated channel response.

\* \* \* \* \*